United States Patent
Masuoka et al.

(10) Patent No.: US 6,704,731 B2
(45) Date of Patent: *Mar. 9, 2004

(54) CONDITIONAL REPLY PROCESSING METHOD, CONDITIONAL REPLY GIVING AGENT SYSTEM DEVICE, AND PROGRAM STORAGE MEDIUM

(75) Inventors: Ryusuke Masuoka, Kawasaki (JP); Hironobu Kitajima, Kawasaki (JP); Tamami Sugasaka, Kawasaki (JP); Akira Sato, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 23 days.

(21) Appl. No.: 09/045,791

(22) Filed: Mar. 23, 1998

(65) Prior Publication Data

US 2002/0019818 A1 Feb. 14, 2002

(30) Foreign Application Priority Data

Sep. 2, 1997 (JP) .............................................. 9-236702

(51) Int. Cl.⁷ ............................................. G06F 17/00
(52) U.S. Cl. ................................ 707/10; 707/3; 707/4; 707/5; 707/6; 707/102; 707/200
(58) Field of Search ...................... 707/1–206; 455/31.3, 455/466; 340/825.54, 825.27–825.44; 714/715; 709/234; 703/13

(56) References Cited

U.S. PATENT DOCUMENTS

| | | | | |
|---|---|---|---|---|
| 4,546,467 A | * | 10/1985 | Yamamoto | 714/715 |
| 5,247,651 A | * | 9/1993 | Clarisse | 703/13 |
| 5,659,727 A | * | 8/1997 | Velissaropoulos et al. | 707/2 |
| 5,719,918 A | * | 2/1998 | Serbetciouglu et al. | 455/466 |
| 5,844,517 A | * | 12/1998 | Lambropoulos | 340/825.54 |
| 5,918,158 A | * | 6/1999 | LaPorta et al. | 455/31.3 |
| 6,075,769 A | * | 6/2000 | Ghanwani et al. | 709/234 |
| 6,604,105 B1 | * | 8/2003 | Roth | 707/100 |
| 6,604,135 B1 | * | 8/2003 | Rodgers et al. | 707/10 |
| 6,643,641 B1 | * | 11/2003 | Snyder | 707/4 |

OTHER PUBLICATIONS developer.netscape.com/docs/manuals/appserv/2_1/apiquery, copyright 1997.*

Ferrari et al., Providing flexibility in information flow control for object–oriented systems, Security and Privacy, 1997, Proceedings, 1997 IEEE Symposium on, May 4–7, 1997 pp. 130–140.*

Karras et al., Comment on 'Neural network for estimation of parameters of sinewave', Electronics Letters, vol., 28 Isue 18, Aug. 27, 1992, pp. 1750–1751.*

Lenor et al., Task characteristics and intelligent aiding, Systems, Man, and Cybernetics, 2000 IEEE International Conference on, vol. 2, Oct. 8–11, 2000, pp. 1123–1127 vol. 2.*

* cited by examiner

*Primary Examiner*—David Jung
(74) *Attorney, Agent, or Firm*—Staas & Halsey LLP

(57) ABSTRACT

If an intermediary agent device or a database agent device cannot uniquely reply to an inquiry message issued from a user agent device, it generates a conditional reply message and returns the generated message to the user agent device. When receiving the conditional reply, the user agent device presents the conditions required for the conditional reply or a reply to a user.

27 Claims, 25 Drawing Sheets

```
(if (and (DEAL-AMOUNT ?DEAL-AMOUNT) (>= ?DEAL-AMOUNT 50))
    (listof "CONDITIONAL APPLE" "NAGANO PREFECTURE" 2000))

(if (and (DEAL-AMOUNT ?DEAL-AMOUNT) (=< ?DEAL-AMOUNT 60))
    (listof "CONDITION EXISTS·APPLE" "NAGANO PREFECTURE" 2500))

(if (and (DEAL-AMOUNT ?DEAL-AMOUNT) (PRODUCER ?PRODUCER)
        (>= ?DEAL-AMOUNT 50) (= PRODUCER "MARUYAMA FARM"))
    (listof "MULTIPLE CONDITIONS EXIST·APPLE" "NAGANO PREFECTURE" 3000))
```

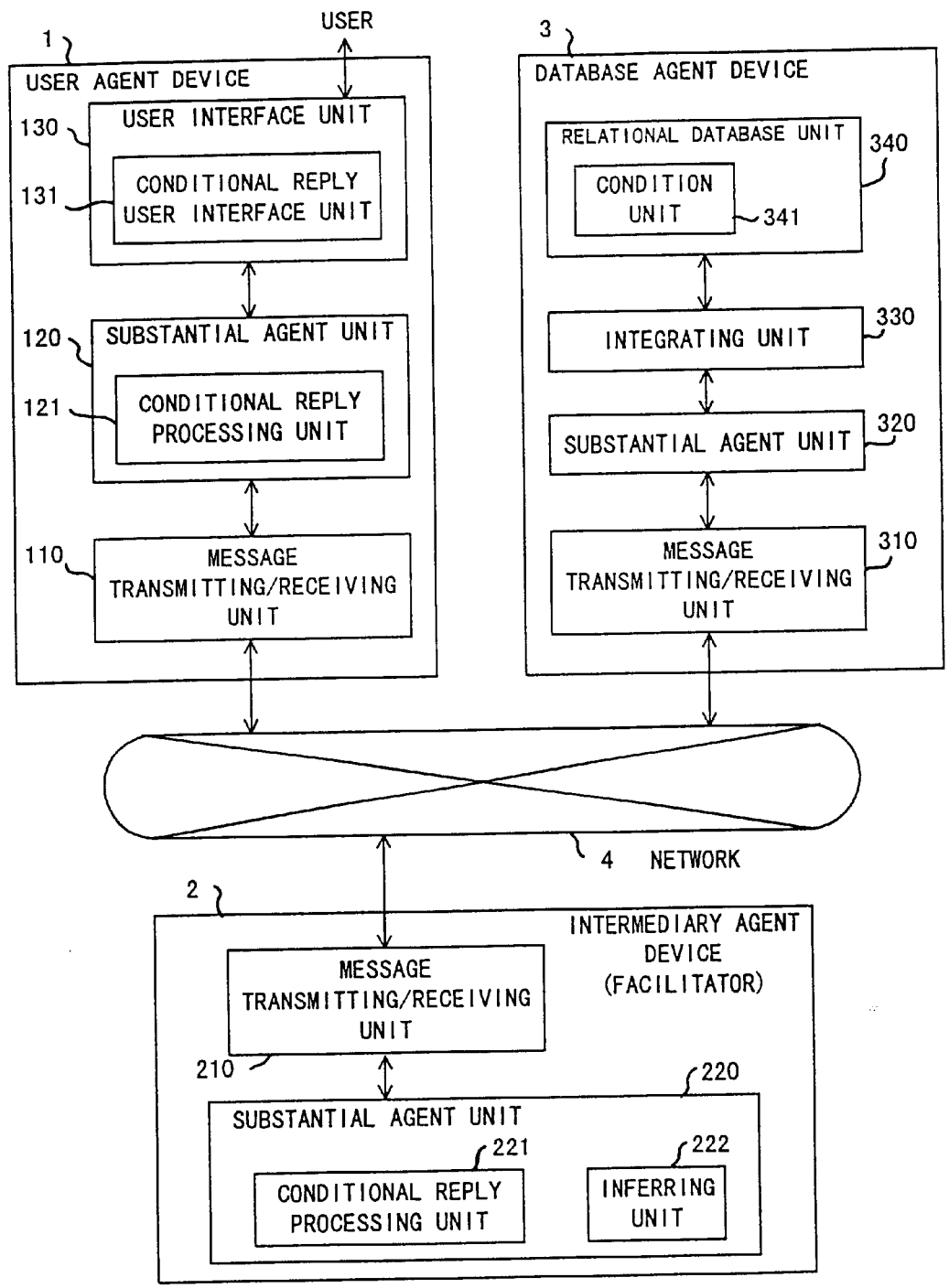
F I G. 1

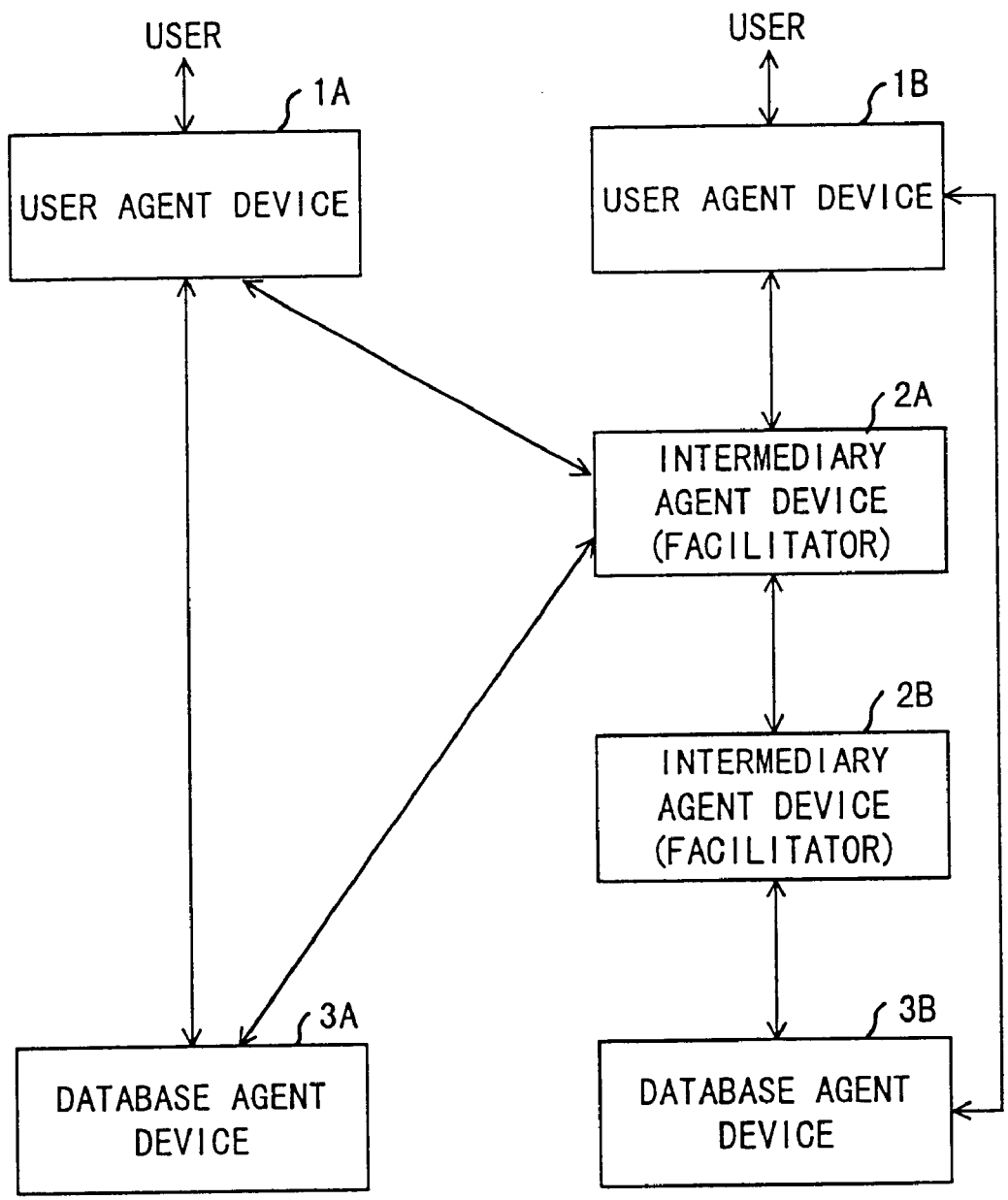
F I G. 2

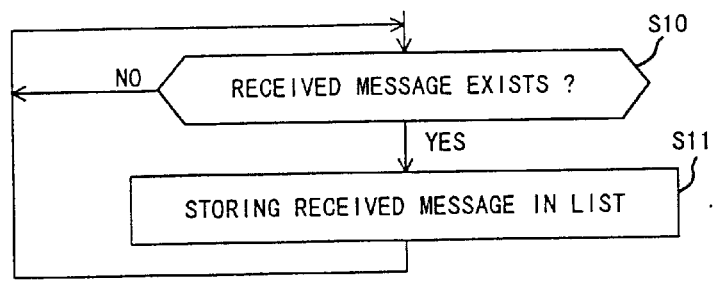
F I G. 3A
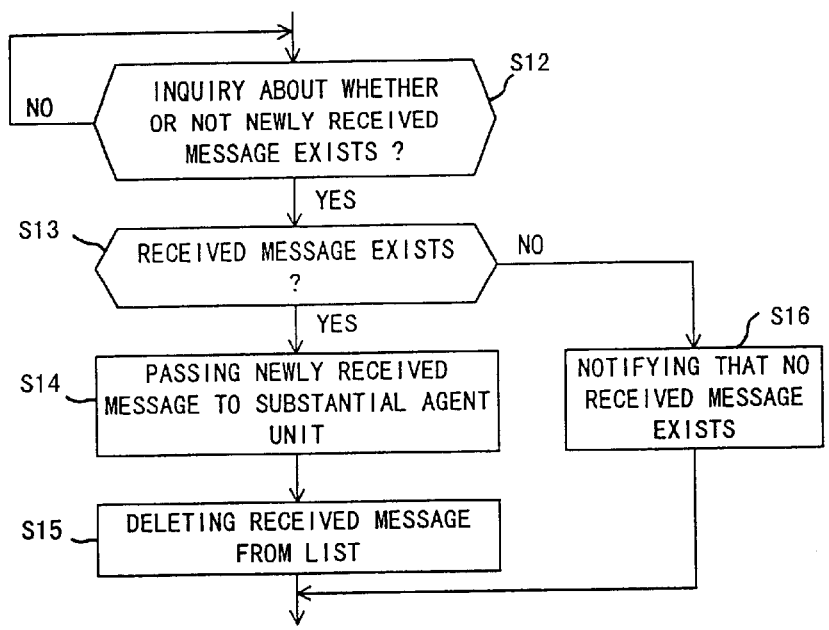
F I G. 3B
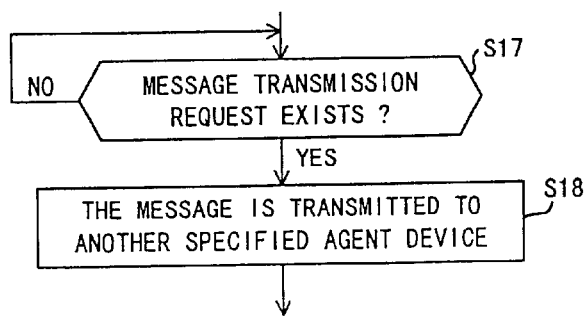
F I G. 3C

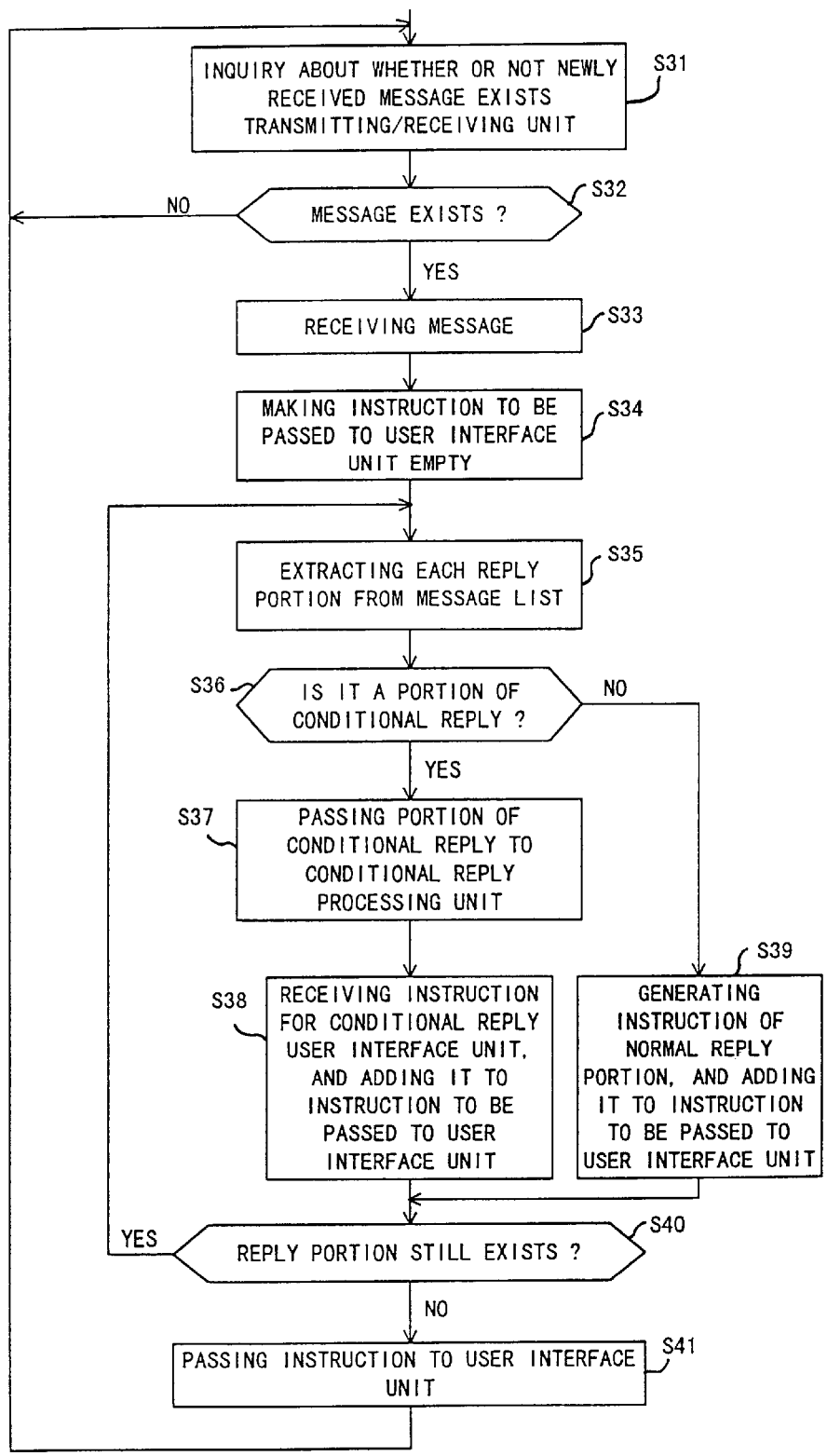
F I G. 5

| CATEGORY | APPLE |
| PRODUCT NAME | |
| PRODUCTION PLACE | |
| UNIT PRICE | |

SEARCH

F I G. 1 4

```
condition    "CATEGORY" "APPLE"
query        "PRODUCT NAME"
query        "PRODUCTION PLACE"
query        "UNIT PRICE"
```

FIG. 15

```
(ask-all
   aspect (?PRODUCT-NAME ?PRODUCTION-PLACE ?UNIT-PRICE)
   :content (and (isa ?x AGRICULTURAL-PRODUCT)
                 (CATEGORY ?x ?CATEGORY)
                 (PRODUCT-NAME ?x ?PRODUCT-NAME)
                 (PRODUCTION-PLACE ?x ?PRODUCTION-PLACE)
                 (UNIT-PRICE ?x ?UNIT-PRICE)
                 (= ?CATEGORY "APPLE"))
   :receiver facilitator@fac-machine
   :sender ua@ua-machine
)
```

FIG. 16

| CATEGORY | PRODUCT NAME | PRODUCTION PLACE | UNIT PRICE | CONDITION |
|---|---|---|---|---|
| APPLE | DELICIOUS APPLE | AOMORI PREFECTURE | 1000 | |
| APPLE | BALL APPLE | HIROSHIMA PREFECTURE | 1500 | |
| APPLE | CONDITIONAL APPLE | NAGANO PREFECTURE | 2000 | '(and (DEAL-AMOUNT ?DEAL-AMOUNT) (>= ?DEAL-AMOUNT 50))' |
| APPLE | CONDITION EXISTS-APPLE | NAGANO PREFECTURE | 2500 | '(and (DEAL-AMOUNT ?DEAL-AMOUNT) (=< ?DEAL-AMOUNT 60))' |
| APPLE | MULTIPLE CONDITIONS EXISTS-APPLE | NAGANO PREFECTURE | 3000 | '(and (DEAL-AMOUNT ?DEAL-AMOUNT) (PRODUCER ?PRODUCER) (=< ?DEAL-AMOUNT 50) (= PRODUCER "MARUYAMA FARM")' |
| STRAWBERRY | LARGE STRAWBERRY | FUKUOKA PREFECTURE | 3000 | |
| ⋮ | ⋮ | ⋮ | ⋮ | |

FIG. 17

```
aspect   (?PRODUCT-NAME ?PRODUCTION-PLACE ?UNIT-PRICE)
:content (and (isa ?x AGRICULTURAL-PRODUCT)
              (CATEGORY ?x ?CATEGORY)
              (PRODUCT-NAME ?x ?PRODUCT-NAME)
              (PRODUCTION-PLACE ?x ?PRODUCTION-PLACE)
              (UNIT-PRICE ?x ?UNIT-PRICE)
              (= ?CATEGORY "APPLE"))
```

FIG. 18

```
(if (and (DEAL-AMOUNT ?DEAL-AMOUNT) (>= ?DEAL-AMOUNT 50))
    (listof "CONDITIONAL APPLE" "NAGANO PREFECTURE" 2000))
(if (and (DEAL-AMOUNT ?DEAL-AMOUNT) (=< ?DEAL-AMOUNT 60))
    (listof "CONDITION EXISTS·APPLE" "NAGANO PREFECTURE" 2500))
(if (and (DEAL-AMOUNT ?DEAL-AMOUNT) (PRODUCER ?PRODUCER)
         (>= ?DEAL-AMOUNT 50) (= PRODUCER "MARUYAMA FARM"))
    (listof "MULTIPLE CONDITIONS EXIST·APPLE" "NAGANO PREFECTURE" 3000))
```

F I G. 1 9

```
(
  ("DELICIOUS APPLE" "AOMORI PREFECTURE" 1000)
  ("BALL APPLE" "HIROSHIMA PREFECTURE" 1500)
  (if (and (DEAL-AMOUNT ?DEAL-AMOUNT) (>= ?DEAL-AMOUNT 50))
      (listof "CONDITIONAL APPLE" "NAGANO PREFECTURE" 2000))
  (if (and (DEAL-AMOUNT ?DEAL-AMOUNT) (=< ?DEAL-AMOUNT 60))
      (listof "CONDITION EXISTS·APPLE" "NAGANO PREFECTURE" 2500))
  (if (and (DEAL-AMOUNT ?DEAL-AMOUNT) (PRODUCER ?PRODUCER)
           (>= ?DEAL-AMOUNT 50) (= PRODUCER "MARUYAMA FARM"))
      (listof "MULTIPLE CONDITIONS EXIST·APPLE" "NAGANO PREFECTURE" 3000))
)
```

F I G. 2 0

```
(reply
  :content
  (
      ("DELICIOUS APPLE" "AOMORI PREFECTURE" 1000)
      ("BALL APPLE" "HIROSHIMA PREFECTURE" 1500)
      (if (and (DEAL-AMOUNT ?DEAL-AMOUNT) (>= ?DEAL-AMOUNT 50))
          (listof "CONDITIONAL APPLE" "NAGANO PREFECTURE" 2000))
      (if (and (DEAL-AMOUNT ?DEAL-AMOUNT) (>= ?DEAL-AMOUNT 60))
          (listof "CONDITION EXISTS·APPLE" "NAGANO PREFECTURE" 2500))
      (if (and (DEAL-AMOUNT ?DEAL-AMOUNT) (PRODUCER ?PRODUCER)
              (>= ?DEAL-AMOUNT 50) (= PRODUCER "MARUYAMA FARM"))
          (listof "MULTIPLE CONDITIONS EXIST·APPLE" "NAGANO PREFECTURE" 3000))
  )
  :receiver facilitator@fac-machine
  :sender dba5@dba5-machine
)
```

FIG. 21

```
(receiver facilitator@fac-machine)
(sender dba5@dba5-machine)
```

FIG. 22

```
(
  ("DELICIOUS APPLE" "AOMORI PREFECTURE" 1000)
  ("BALL APPLE" "HIROSHIMA PREFECTURE" 1500)
  (if (and (DEAL-AMOUNT ?DEAL-AMOUNT) (>= ?DEAL-AMOUNT 50))
    (listof "CONDITIONAL APPLE" "NAGANO PREFECTURE" 2000))
  (if (and (DEAL-AMOUNT ?DEAL-AMOUNT) (=< ?DEAL-AMOUNT 60))
    (listof "CONDITION EXISTS·APPLE" "NAGANO PREFECTURE" 2500))
  (if (and (DEAL-AMOUNT ?DEAL-AMOUNT) (PRODUCER ?PRODUCER)
        (>= ?DEAL-AMOUNT 50) (= PRODUCER "MARUYAMA FARM"))
    (listof "MULTIPLE CONDITIONS EXIST·APPLE" "NAGANO PREFECTURE" 3000))
)
```

FIG. 23

| REPLACEMENT PATTERN |
|---|
| (DEAL-AMOUNT 100) |
| (receiver facilitator@fac-machine) |
| (sender dba5@dba5-machine) |

FIG. 24A

| REPLACEMENT PATTERN |
|---|
| (DEAL-AMOUNT(ask-one :receiver omnipotent@heaven :aspect ?DEAL-AMOUNT :content(DEAL-AMOUNT ?DEAL-AMOUNT))) |
| (receiver facilitator@fac-machine) |
| (sender dba5@dba5-machine) |

FIG. 24B

```
(reply
  :content
  (
      ("DELICIOUS APPLE" "AOMORI PREFECTURE" 1000)
      ("BALL APPLE" "HIROSHIMA PREFECTURE" 1500)
      ( "CONDITIONAL APPLE" "NAGANO PREFECTURE" 2000)
      (if (and (PRODUCER ?PRODUCER) (= PRODUCER "MARUYAMA FARM"))
          (listof "MULTIPLE CONDITIONS EXIST·APPLE" "NAGANO PREFECTURE" 3000))
  )
  :receiver facilitator@fac-machine
  :sender dba5@dba5-machine
)
```

FIG. 25

```
(reply
  :content
  (
      ("DELICIOUS APPLE" "AOMORI PREFECTURE" 1000)
      ("BALL APPLE" "HIROSHIMA PREFECTURE" 1500)
      ( "CONDITIONAL APPLE" "NAGANO PREFECTURE" 2000)
      (if (and (PRODUCER ?PRODUCER) (= PRODUCER "MARUYAMA FARM"))
          (listof "MULTIPLE CONDITIONS EXIST·APPLE" "NAGANO PREFECTURE" 3000))
  )
  :receiver ua@ua-machine
  :sender facilitator@fac-machine
)
```

FIG. 26

| ITEM NUMBER/NAME | CONDITION EXIST ? | VALUE |
|---|---|---|
| 1 | N | "DELICIOUS APPLE" |
| 2 | N | "AOMORI PREFECTURE" |
| 3 | N | 1000 |

FIG. 27A

| ITEM NUMBER/NAME | CONDITION EXIST ? | VALUE |
|---|---|---|
| 1 | N | "MULTIPLE CONDITIONS EXIST·APPLE" |
| 2 | N | "NAGANO PREFECTURE" |
| 3 | N | 3000 |
| PRODUCER | Y | |

FIG. 27B (and (PRODUCER ?PRODUCER) (= PRODUCER "MARUYAMA FARM"))

CONDITIONAL REPLY PROCESSING METHOD, CONDITIONAL REPLY GIVING AGENT SYSTEM DEVICE, AND PROGRAM STORAGE MEDIUM

BACKGROUND OF THE INVENTION

1. Field of the Invention

The present invention relates to an agent system, and more particularly to a conditional reply processing method and a conditional reply giving agent system device, which allow a message to be exchanged as a conditional reply if a reply can be made by imposing a condition despite the absence of a direct reply, and to a program storage medium for this implementation.

2. Description of the Related Art

The WWW (World Wide Web) has been successful, and the Internet has rapidly become popular. As a result, huge amounts of information have begun to be placed on the Internet. In addition to the Internet, huge amounts of information in electronic forms are stored in on-line databases, etc.

However, users have difficulty to find their desired information. As is often the case, the users must view many screens one by one in order to find out the information (page) that they actually desire, for example, with a method for tracing respective links or with a method for searching a list including a large amount of hit data obtained with a keyword search. As described above, the users cannot effectively use existing information. Therefore, a considerable load is imposed on busy users in terms of time and effort.

Especially, because there is no direct reply to an inquiry request made between agents due to the insufficiency of conditions although there is actually a useful reply, it is sometimes impossible to obtain a reply to the inquiry. Therefore, an agent processing technique with flexibility is required, for example, for a search of data distributed and located in a network.

An agent system is a technique for allowing pieces of software to be linked by using software as an autonomous module, which is a software agent speaking a common language (such as ACL (Agent Communication Language). This system makes pieces of software communicate with each other as software agents, and links them, so that the information useful to a user can be collected without user's tracing links so as to retrieve desired information.

This agent system, however, fundamentally has the scheme that one agent gives a direct reply to an inquiry message transmitted by another agent.

Accordingly, there is no conventional scheme for coping with the case in which an agent on a reply side can give a reply by imposing some conditions although it has no direct reply.

Assume that a service to retrieve a product name, a production place and a unit price of an apple is requested to a database agent having a database of agricultural products. In this case, the unit price may sometimes vary depending on a deal amount and a producer, even if the name and production place of the apple are identical. With the conventional search, all of the different unit prices included in the database are simply searched and retrieved. In such a case, a meaningful reply cannot be obtained if also conditions such as a deal amount, etc. are searched, and the database agent cannot give an effective reply.

Additionally, if a reply cannot be determined due to the insufficiency of conditions, some database agents give a reply "no corresponding data". Also in such a case, users cannot obtain their desired information.

Especially, in a system where one inquiry made by a user agent is distributed to a plurality of database agents via an intermediary agent, the conditions included in the inquiry, on which each of the plurality of database agents gives a reply to the inquiry, may sometimes differ depending on the database agents. How to cope with this phenomenon by the user agent or the intermediary agent in such a case is a problem.

Conventionally, there is the disadvantage that information is not notified to an opposing agent although the information about the inquiry exists in an agent on a reply side, as described above.

SUMMARY OF THE INVENTION

An object of the present invention is to provide a conditional reply processing method, a conditional reply giving agent system device, and a storage medium storing a conditional reply processing program, which allow a more refined information link between agents by transmitting a conditional reply and enabling the receiving side to perform processing if a reply can be given with the imposition of a condition.

A conditional reply giving agent system device according to the present invention comprises a replying unit, a presenting unit, a transmitting unit, a data storing unit, a conditional expression inputting unit, a searching unit, a determining unit, and an answering unit.

The first aspect of the present invention is that the replying unit obtains and gives a conditional reply in addition to a direct reply to a request made by a certain agent device. The presenting unit presents the contents of the reply including the conditional reply in the agent device which receives the reply.

The second aspect of the present invention is that a direct reply and a conditional reply to a request made to another agent device are integrated and given. The presenting unit presents the contents of the reply including the conditional reply to a user via a user interface unit when receiving the reply including the conditional reply to the request issued by another agent device.

The third aspect of the present invention is that the transmitting unit obtains a conditional reply and transmits the conditional reply message to a first agent device if it transmits the request message from a first agent device to a second agent device, and cannot obtain the unique reply from the second agent device due to the insufficiency of conditions for replying to the request. The presenting unit presents the contents of the reply including the conditional reply to a user via a user interface unit when receiving the conditional reply message from the third agent device.

The fourth aspect of the present invention is that the data storing unit stores a plurality of pieces of data to be searched. The conditional expression inputting unit inputs a conditional expression for retrieving desired data. The searching unit searches the data storing unit by using the conditional expression input by the conditional expression inputting unit. The determining unit determines whether or not the conditions of the conditional expression input by the conditional expression inputting unit are insufficient. The answering unit answers that the conditions are insufficient if they are determined to be insufficient.

BRIEF DESCRIPTION OF THE DRAWINGS

FIG. 1 is a block diagram explaining the outline of the present invention;

FIG. 2 is a block diagram exemplifying the configuration of the system to which the present invention is applied;

FIG. 3A is a flowchart showing the process performed by a message transmitting/receiving unit in a user agent device;

FIG. 3B is a flowchart showing the process performed by the message transmitting/receiving unit in the user agent device;

FIG. 3C is a flowchart showing the process performed by the message transmitting/receiving unit in the user agent device;

FIG. 5 is a flowchart showing the process performed by the substantial agent unit in the user agent device;

FIG. 14 exemplifies a retrieval instruction input screen;

FIG. 15 exemplifies a retrieval instruction;

FIG. 16 exemplifies an ACL message;

FIG. 17 exemplifies a relational database;

FIG. 18 exemplifies the contents of a message;

FIG. 19 shows an example of an ACL list;

FIG. 20 shows another example of an ACL list;

FIG. 21 exemplifies a reply message;

FIG. 22 exemplifies registration made to the inferring unit;

FIG. 23 exemplifies the contents of a message;

FIG. 24A shows an example of a replacement pattern table;

FIG. 24B shows another example of the replacement pattern table;

FIG. 25 exemplifies an answer message;

FIG. 26 exemplifies an answer message;

FIG. 27A shows an example of an instruction issued to the user interface unit;

FIG. 27B shows another example of the instruction issued to the user interface unit;

DESCRIPTION OF THE PREFERRED EMBODIMENT

Figure 4:
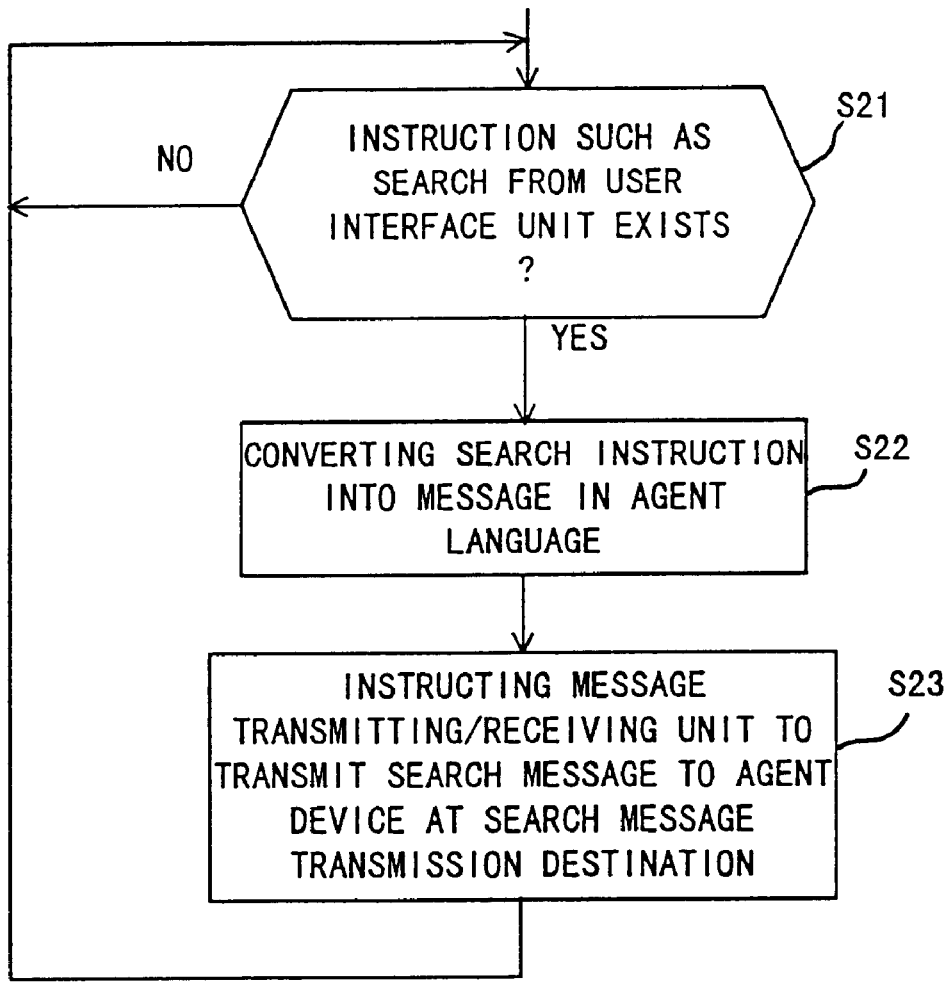
FIG. 4 is a flowchart showing the process performed by a substantial agent unit in the user agent device.

Provided below is the explanation about the details of the present invention by referring to the drawings.

FIG. 1 is a block diagram explaining the outline of the present invention.

A user agent device 1, an intermediary agent device (facilitator) 2 and a database agent device 3 are interconnected via a network 4. The user agent device 1, the intermediary agent device (facilitator) 2, and the database agent device 3 communicate with each other by using an ACL. The database agent device 3 allows an access from the user agent device 1, etc. by advertising its own capability to the intermediary agent device 2.

A user agent device 1 comprises a message transmitting/receiving unit 110, a substantial agent unit 120, and a user interface unit 130. The substantial agent unit 120 includes a conditional reply processing unit 121. The user interface unit 130 includes a conditional reply user interface unit 131.

The message transmitting/receiving unit 110 transmits/receives a message to/from another agent device.

The substantial agent unit 120 performs processing including a message process in the user agent device 1. For example, it processes the message transmitted from another agent device, and determines the next process of the user agent device 1. The substantial agent unit 120 also monitors a user instruction transmitted from the user interface unit 130. Additionally, it instructs the user interface unit 130 to perform display, transmits a message to another agent device, etc.

The conditional reply processing unit 121 processes a conditional reply message among the messages transmitted from another agent device, and passes the processed result to the substantial agent unit 120.

The user interface unit 130 processes a request input from a user, a message display for a user, etc. The conditional reply user interface unit 131 presents the contents of the reply including the conditional reply to a user, and further presents the details of the conditional reply according to a requirement such as a user instruction.

Furthermore, the user agent device 1 may comprise an inferring unit for satisfying all or part of the conditions of a conditional reply according to the pattern information for replacing a preregistered condition if the reply includes the conditional reply, when necessary.

The intermediary agent device (facilitator) 2 is a device for intermediating a request and a reply between other agent devices. The intermediary agent device 2 comprises a message transmitting/receiving unit 210, and a substantial agent unit 220. The substantial agent unit 220 includes a conditional reply processing unit 221, and an inferring unit 222.

The message transmitting/receiving unit 210 processes the transmission/reception of a message from another agent device similar to the message transmitting/receiving unit 110 in the user agent device 1. The substantial agent unit 220 intermediates a requested message between agent devices.

The conditional reply processing unit 221 satisfies all or part of conditions of a conditional reply together with the inferring unit 222.

The inferring unit 222 stores replacement patterns for replacing a condition of a conditional reply, and replaces the condition of the reply passed from the conditional reply processing unit 221 with predetermined data based on the replacement patterns as much as it can.

The database agent device 3 comprises a message transmitting/receiving unit 310, a substantial agent unit 320, an integrating unit 330, and a relational database unit 340. The relational database unit 340 includes a condition unit 341.

The relational database unit 340 has the capability for managing a relational database.

The condition unit 341 is a unit in which conditions are described in the relational database.

The integrating unit 330 extracts and integrates normal information and a conditional reply in the relational database 340.

If a user issues a retrieval instruction to the user agent device 1 via the user interface unit 130, it is transmitted to the substantial agent unit 120. The substantial agent unit 120 selects another suitable agent device (such as the intermediary agent device 2, the database agent device 3, etc.), and transmits the retrieval instruction as a message via the message transmitting/receiving unit 110.

When the message from another agent device is received by the message transmitting/receiving unit 210 in the intermediary agent device 2, the reception of the message and its contents are notified to the substantial agent unit 220.

If the message is, for example, the message for requesting the intermediacy from the user agent device 1, the substantial agent unit 220 selects the intermediary destination of the database agent device 3, etc. according to the contents of the message, converts the intermediary message into a message which can be interpreted by the database agent device 3, etc, and transmits the converted message to the database agent device 3, etc. by using the message transmitting/receiving unit 210.

If the message received by the message transmitting/receiving unit 210 is, for example, the message including a conditional reply from the data agent device 3, the substantial agent unit 220 transmits to the conditional reply processing unit 221 the portion of the conditional reply included in the message. The conditional reply processing unit 221 passes the elements of the conditional reply to the inferring unit 222.

The inferring unit uses preregistered replacement patterns, replaces the passed elements with the values determined by the patterns as much as it can, and passes the result to the conditional reply processing unit 221. The conditional reply processing unit 221 satisfies all or part of the conditions by using the result from the inferring unit 222.

Additionally, the conditional reply processing unit 221 may transmit the message for requesting the satisfaction of the conditions to the database agent device 3 via the message transmitting/receiving unit 210 if necessary, and satisfies all or part of the conditions that can be solved with the obtained result. It passes all or part of the satisfied replies to the message transmitting/receiving unit 210.

The message transmitting/receiving unit 210 transmits the reply message including the conditional reply to the user agent device 1 or another agent device, which is the transmission source of the intermediary message.

When receiving the request message such as a retrieval request, etc. from the user agent device 1 or the intermediary agent device 2, the message transmitting/receiving unit 310 in the database agent device 3 notifies the substantial agent unit 310 of the reception of the message and its contents.

The substantial agent unit 320 analyzes the request message, and transmits it to the integrating unit 330. The integrating unit 330 analyzes that request message, and retrieves the relational database 340 in order to make a reply to the request. If the retrieval result includes the information from the condition unit 341, it is combined with another item of information, and structured as a conditional reply. The integrating unit 330 integrates these results and returns the integrated result to the substantial agent unit 320.

The substantial agent unit 320 transmits the integrated result to the user agent device 1 or the intermediary agent device 2, which has transmitted the request message, via the message transmitting/receiving unit 310, as the message replying to the request message.

When receiving the reply message including the conditional reply from the intermediary agent device 2 or the database agent device 3, the user agent device 1 notifies the substantial agent unit 120 of the reception of the reply message and its contents.

The substantial agent unit 120 transmits the portion of the conditional reply included in the message to the conditional reply processing unit 121. The conditional reply processing unit 121 outputs the instruction for the conditional reply user interface unit 131. The substantial agent unit 120 transmits the information for a display including this instruction to the user interface unit 130.

The user interface unit 130 transmits to the conditional reply user interface unit 131 the portion of the instruction for the conditional reply user interface unit 131, and displays the conditional reply.

The program for implementing processes in each of the above described units by using a computer can be stored in/onto a suitable storage medium such as a computer-readable portable medium memory, a semiconductor memory, a hard disk, etc.

According to the present invention, a new interface unit between agent devices is provided as described above. The significant differences from the conventional technique are described below.

The conventional agent system has the scheme that a unique value is replied to a requested item. However, the item value to be replied may sometimes relate to another item value. For example, a price may vary depending on a deal amount, a deal partner, a deal date, etc.

Also with the conventional technique, if the item value included in a database, etc. varies depending on conditions, all of which are specified from a user agent device, the item value satisfying the conditions can be accurately extracted. However, if the conditions are insufficient, there is no reply means despite the existence of the value replying to the requested item. Although the conditional reply means becomes necessary in such a case, it is impossible to implement this means, for example, for an SQL which is a relational database retrieval language.

For the agents making communications using an ACL (Agent Communication Language) which is a language common to agents, the scheme for making a reply with a condition imposed can be incorporated. The present invention implements this scheme.

According to the present invention, even if a reply to, for example, an inquiry message for requesting a price varies depending on a deal amount, or even if the deal amount is not specified in the inquiry message, the conditional reply message such as "the price per box is ¥2,000 if the deal amount is equal to or less than 50 boxes, and ¥1,900 if the deal amount is more than 50 boxes" is generated, and transmitted to a requesting source.

With such a conditional reply message, the user agent device 1 can recognize that another condition is required for uniquely determining the reply, while the intermediary agent device 2 or the database agent device 3 can notify the user agent device 1 that the reply value may vary depending on the condition. That is, negotiation can be made between the agent devices.

FIG. 2 exemplifies the configuration of the system to which the present invention is applied.

As shown in this figure, the present invention can be implemented by arbitrarily combining the user agent device 1, the intermediary agent device 2, and the database agent device 3, which are shown in FIG. 1.

In the example shown in FIG. 2, a user agent device 1A and a database agent device 3A are directly connected via a network. These devices may transmit/receive messages via an intermediary agent device 2A. The user agent devices 1A and 1B may be connected to a database agent device 3B via a plurality of intermediary agent devices 2A and 2B. The connection form is not limited to these implementations. An arbitrary form is possible.

Provided next are the explanations about the process flows of the respective units and the examples of the data structures of required tables in the respective agent devices shown in FIG. 1.

[1] Message Transmitting/Receiving Unit in the User Agent Device

FIGS. 3A, 3B, and 3C are flowcharts showing the process performed by the message transmitting/receiving unit 110 in the user agent device 1.

The process of the message transmitting/receiving unit 110 is composed of a message reception loop shown in FIG. 3A, and two passive processes shown in FIGS. 3B and 3C.

In the message reception checking process, it is checked whether or not there is a received message in step S10 as shown in FIG. 3A. If "YES", the received message is stored in a list in step S11.

For the inquiry about whether or not there is a received message, the process shown in FIG. 3B is passively performed.

In step S12, it is determined whether or not there is the inquiry about whether or not there is a newly received message from the substantial agent device 120. If "YES", the process goes to step S13, where the storage list of received messages is checked.

If it is determined that the newly received message is included in the storage list of received messages, that message is passed to the substantial agent unit 120 in step S14 and deleted from the list in step S15.

If it is determined that no newly received message is included in step S13, the absence of the newly received message is notified to the substantial agent unit 120 in step S16.

Additionally, for a message transmission request, the process shown in FIG. 3C is passively performed.

In step S17, it is determined whether or not the message transmission request is received. If "YES", the process goes to step S18, where the message is transmitted to another specified agent device.

The data structure required for the message transmitting/receiving unit 110 in order to perform the above described process is a pointer pointing up to where the list of received messages or a received message is read out.

[2] Substantial Agent Unit in the User Agent Device

FIGS. 4 and 5 are flowcharts of the processes performed by the substantial agent unit 120 in the user agent device 1. The process of the substantial agent unit 120 in the user agent device 1 is composed of two process loops shown in FIGS. 4 and 5.

In the process for checking the instruction from the user interface unit 130, it is checked whether or not the instruction such as a retrieval instruction, etc. from the user interface unit 130 has been received in step S21. If "YES", the process goes to step S22, where the retrieval instruction is converted into a message in an agent language. Then, the instruction for transmitting the converted retrieval message to a retrieval message transmission destination agent device is issued to the message transmitting/receiving unit 110 in step S23.

In the process for checking a message from another agent device, the inquiry about whether or not there is a newly received message is made to the message transmitting/receiving unit 110 in step S31 as shown in FIG. 5. In step S32, it is determined whether or not there is the newly received message. If "YES", the newly received message is received from the message transmitting/receiving unit 110 in step S33. In step S34, the instruction to be passed to the user interface unit 130 is made empty so as to process the received message.

In step S35, the portion of each reply is sequentially extracted from the message list. In step S36, it is determined whether or not the message is the portion of a conditional reply. If "YES", the portion of the conditional reply is passed to the conditional reply processing unit 121 in step S37. Then, the instruction for the conditional reply user interface unit 131 is received from the conditional reply processing unit 121, and added to the instruction to be passed to the user interface unit 130 in step S38.

If "NO" in step S36, the instruction of the portion of a normal reply for the user interface unit 130 is generated and added to the instruction to be passed to the user interface unit 130 in step S39.

In step S40, it is determined whether or not the portion of the reply yet to be processed is still left in the message list. If "YES", the process in steps S35 through S39 is repeated until no more portion yet to be processed is left. If "NO" in step 40, the instructions obtained in the above described processes are unified and passed to the user interface unit 130 in step S41.

[3] Conditional Reply Processing Unit in the User Agent Device

Figure 6:
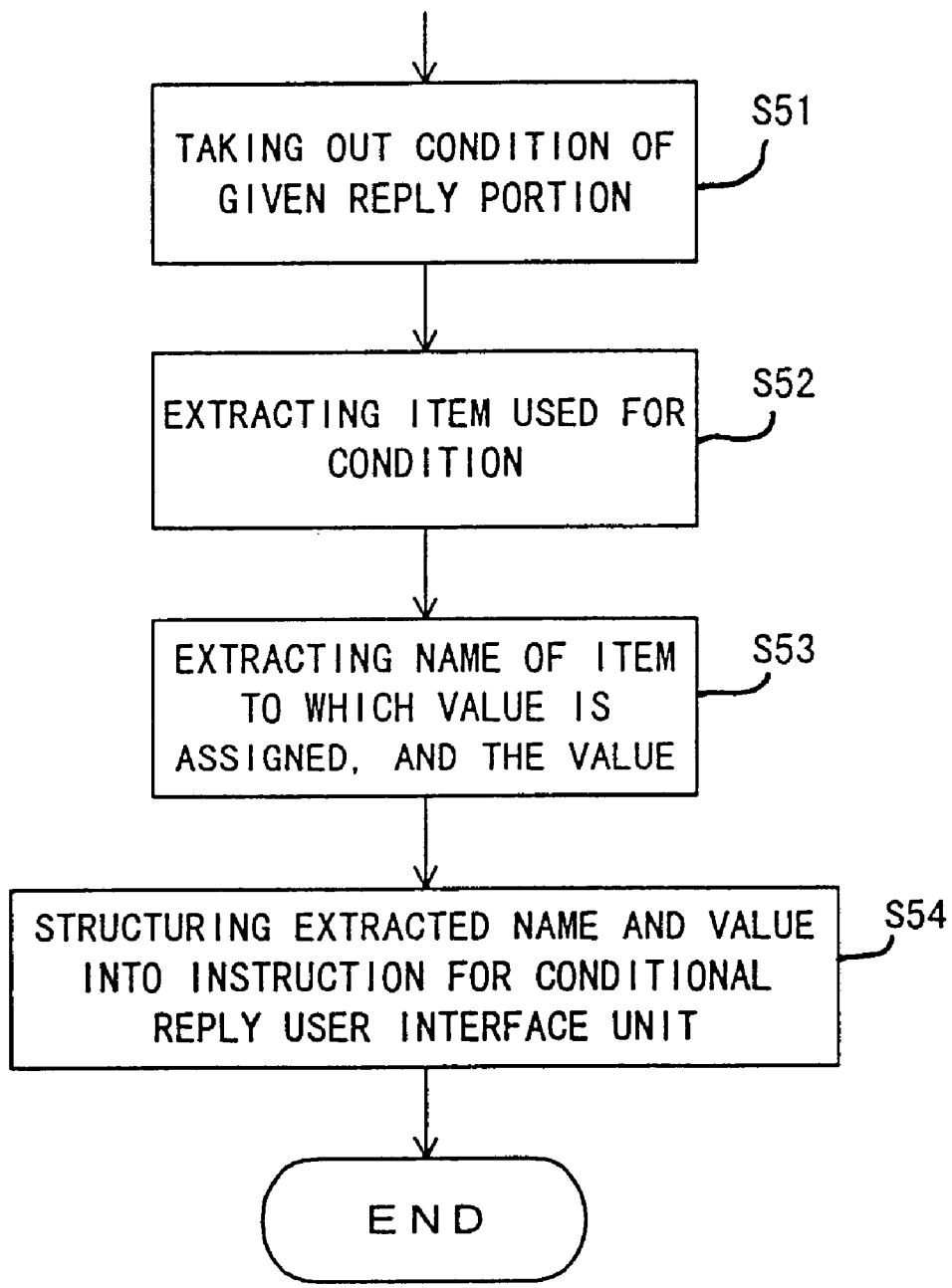
FIG. 6 is a flowchart showing the process performed by a conditional reply processing unit in the user agent device.

FIG. 6 is a flowchart showing the process performed by the conditional reply processing unit 121 in the user agent device 1.

In step S51, the conditional reply processing unit 121 extracts the condition of the portion of the reply provided from the substantial agent unit 120. In step S52, the name of the item used in the condition is extracted. In step S53, the name of the item to which a value is assigned and the value are extracted. In step S54, the extracted name and value are structured into the instruction for the conditional reply user interface unit 131, and returned to the substantial agent unit 120.

As the information required for the above described process, the substantial agent unit 120 has a "retrieval message transmission destination agent device name".

[4] User Interface Unit in the User Agent Device

Figure 7A:
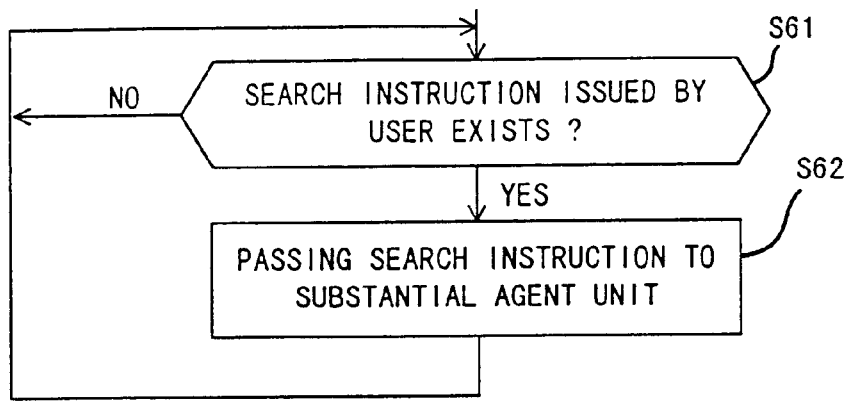
FIG. 7A is a flowchart showing the process performed by a user interface unit in the user agent device.
Figure 7B:
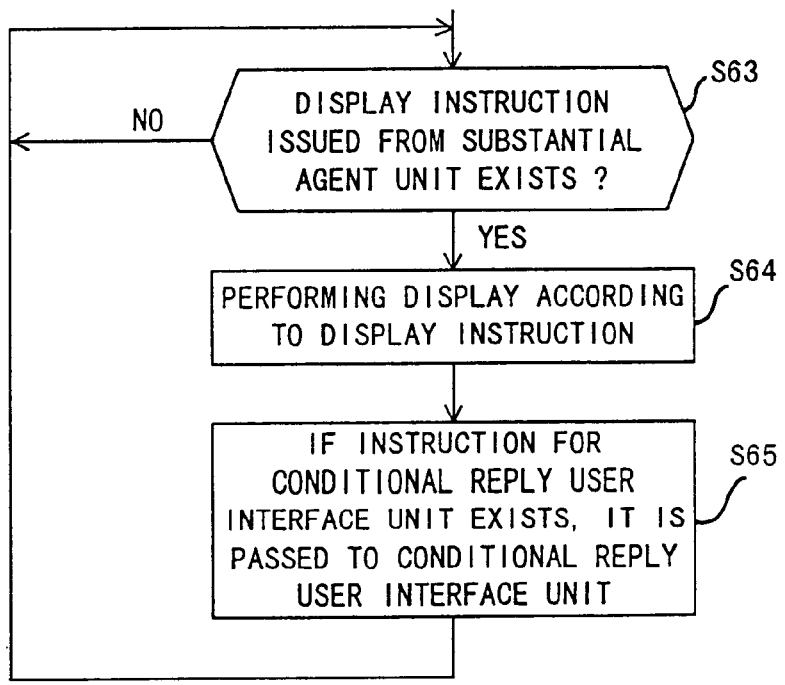
FIG. 7B is a flowchart showing the process performed by the user interface unit in the user agent device.

FIGS. 7A and 7B are flowcharts of the process performed by the user interface unit 130 in the user agent device 1. The process of the user interface unit 130 is composed of two process loops.

In the process for checking the presence/absence of a retrieval instruction issued from a user, it is determined whether or not the retrieval instruction is issued from a user in step S61 as shown in FIG. 7A. If "YES", the retrieval instruction is passed to the substantial agent unit 120 in step S62. The contents of the retrieval instruction passed from the user interface unit 130 is a list of item names to be searched and a list of retrieval conditions.

Next, in the process for checking the presence/absence of a display instruction issued from the substantial agent unit 120, it is determined whether or not there is the display instruction issued from the substantial agent unit 120 in step S63 as shown in FIG. 7B. If "YES", display is performed according to the display instruction in step S64. In step S65, if the display instruction includes the instruction for the conditional reply user interface unit 131, it is passed to the conditional reply user interface unit 131. The contents of the display instruction for the conditional reply user interface unit 131 is the name of an item, a flag indicating whether or not the item is imposed with a condition, the list including that item, and the text describing the condition.

[5] Message Transmitting/Receiving Unit in the Intermediary Agent Device

Since the process of the message transmitting/receiving unit 210 in the intermediary agent device 2 is similar to that of the message transmitting/receiving unit 110 in the user agent device 1, which is shown in FIGS. 3A, 3B, and 3C, its explanation is omitted here.

[6] Substantial Agent Unit in the Intermediary Agent Device

Figure 8:
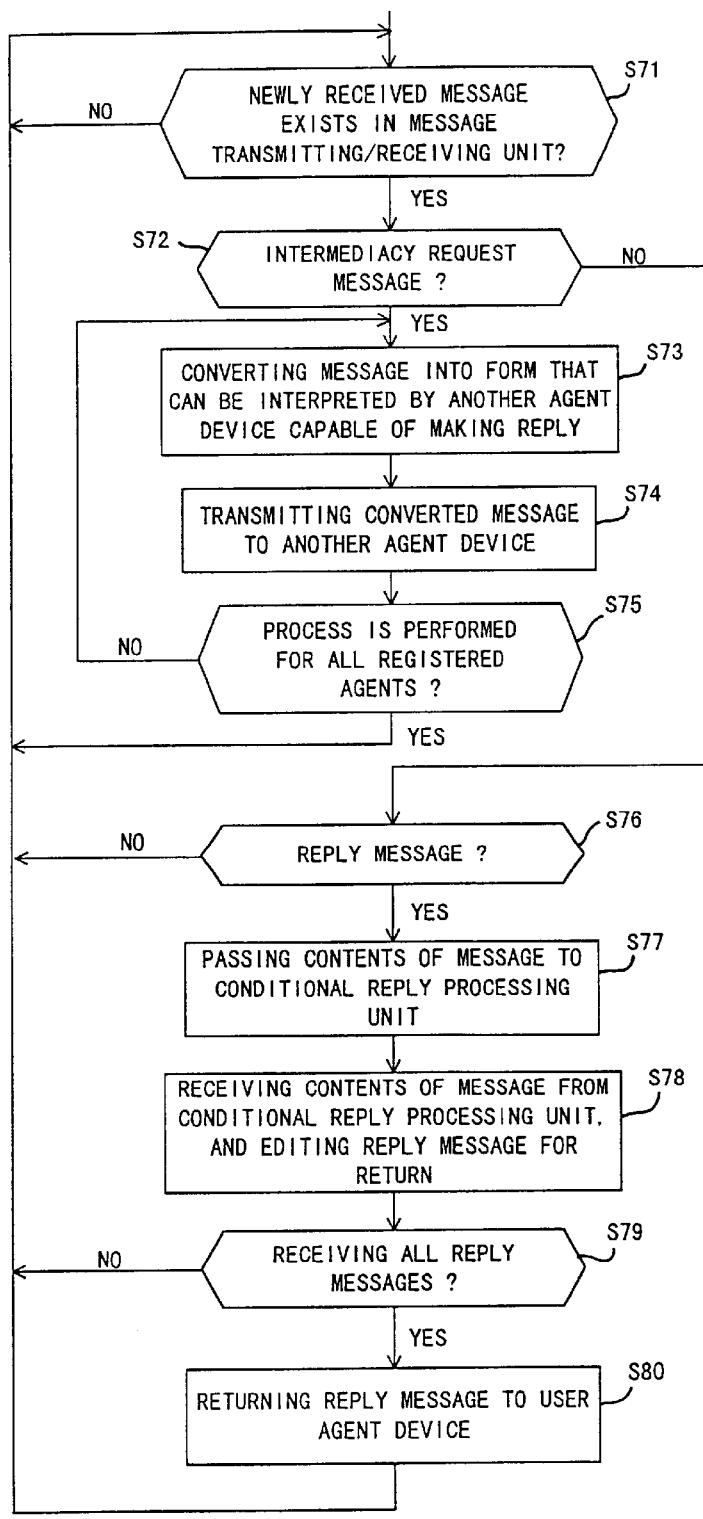
FIG. 8 is a flowchart showing the process performed by a substantial agent unit in an intermediary agent device.
Figure 9:
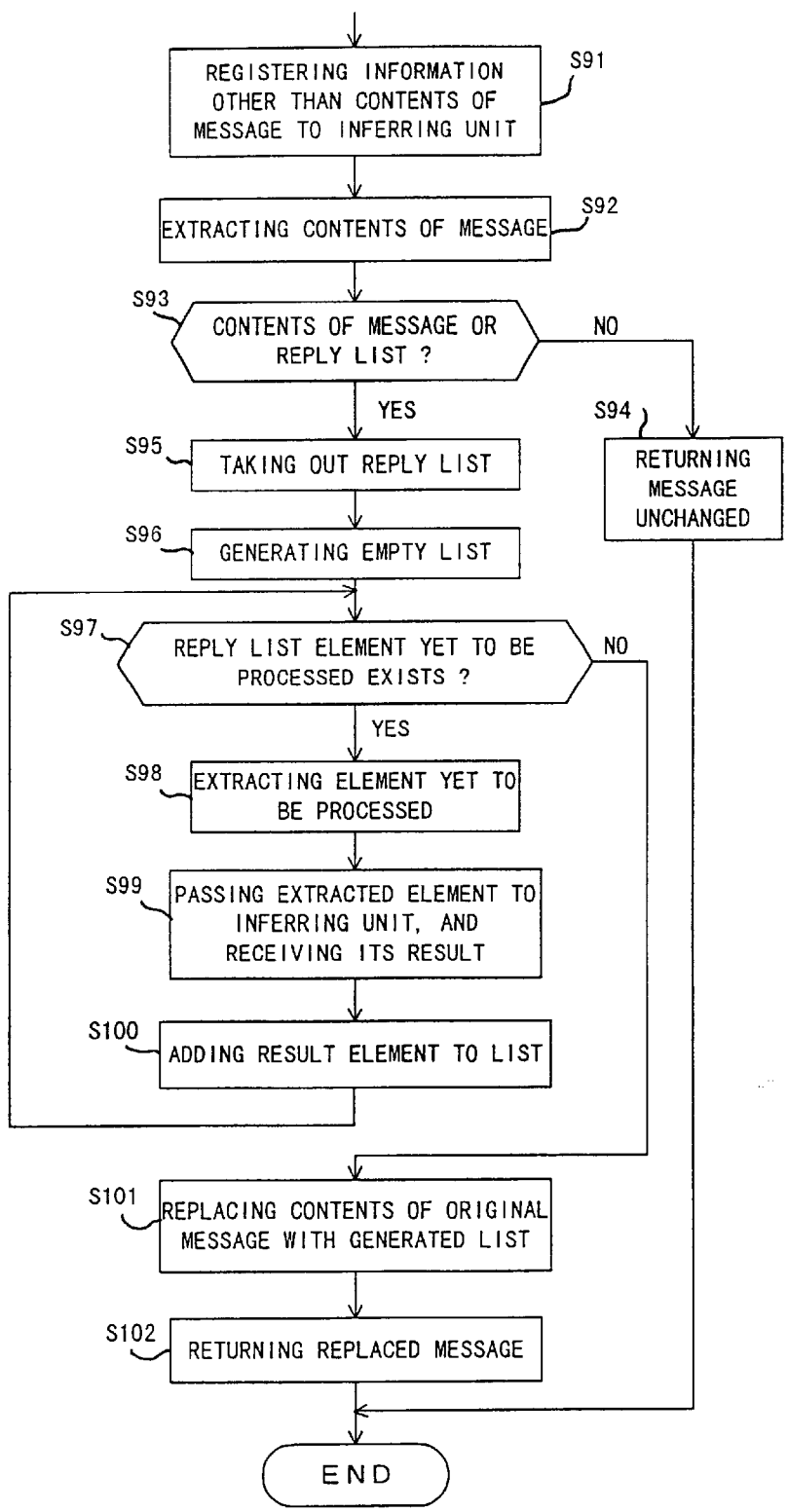
FIG. 9 is a flowchart showing the process performed by a conditional reply processing unit in the intermediary agent device.

FIG. 8 is a flowchart showing the process performed by the substantial agent unit 220 in the intermediary agent device 2.

The substantial agent unit 220 first inquires of the message transmitting/receiving unit 210 whether or not there is a newly received message in step S71. If "YES", the newly received message is received from the message transmitting/receiving unit 210 in step S72. Then, it is checked whether or not the received message is a message for requesting the intermediacy to another agent device in step S72. If "YES", the process goes to step S73. If "NO", the process skips to step S76.

If the received message is an intermediacy request message issued from the user agent device 1, etc., the list of preregistered agent devices is referenced, the agent device which can make a reply (such as the database agent device 3) is extracted, and the intermediacy request message is converted into the message that the extracted agent device can interpret. Then, the converted message is transmitted to the agent device which can make a reply by using the message transmitting/receiving unit 210 in step S74. In step S75, it is determined whether or not the process for all of the preregistered agents is completed. If "NO", the process in steps S73 and 74 is repeated until the process for all of the preregistered agents is completed. When the process for all of the agents is completed, control is returned to step S71 where a next newly received message is to be processed.

If the received message is not the intermediacy request message in step S72, it is determined whether or not the received message is the message replying to the intermediated message in step S76. If "NO", control is transferred to the process according to that message or the process for a newly received message. If the received message is the reply message from the database agent device 3, etc., the contents of the message is passed to the conditional reply processing unit 221 in step S77. Then, the contents of the message is received from the conditional reply processing unit 221, and the reply message to be returned is edited in step S78. In step S79, it is checked whether or not all of the reply messages to the intermediated messages have been received. If "NO", the process goes back to step S71, and waits for the reception of the next message.

If "YES" in step S79, the edited reply message is returned to the transmission source of the intermediacy request message, such as the user agent device 1, etc. by using the message transmitting/receiving unit 210 in step S80.

[7] Conditional Reply Processing Unit in Intermediary Agent Device

In step S91, the conditional reply processing unit 221 registers the information except for the contents of the message that the substantial agent unit 220 receives from the message transmitting/receiving unit 210 to the inferring unit 222. Then, the contents of the message is extracted in step S92. In step S93, it is checked whether or not the contents of the message is a reply list. If "NO", the message is returned to the substantial agent unit 220 unchanged in step S94 and the process is terminated.

If the contents of the message is the reply list in step S93, the reply list which is the contents of the message is extracted in step S95. In step S96, the reply list is made empty.

Next, it is determined whether or not the reply list element yet to be processed is left in step S97. If "YES", the element yet to be processed is extracted in step S98. The extracted element is passed to the inferring unit 222, and the result is received in step S99. If there is the result returned from the inferring unit 222, the resultant element is added to the list in step S100. The above described steps S97 through S100 are repeated. In step S101, when all of the reply list elements yet to be processed have been processed, that is, if no element yet to be processed is left in step S97, the contents of the original message is replaced by using the list formed with the process performed in step S100. The replaced message is then returned to the substantial agent unit 220 in step S102.

[8] Inferring Unit in the Agent Device

Figure 10:
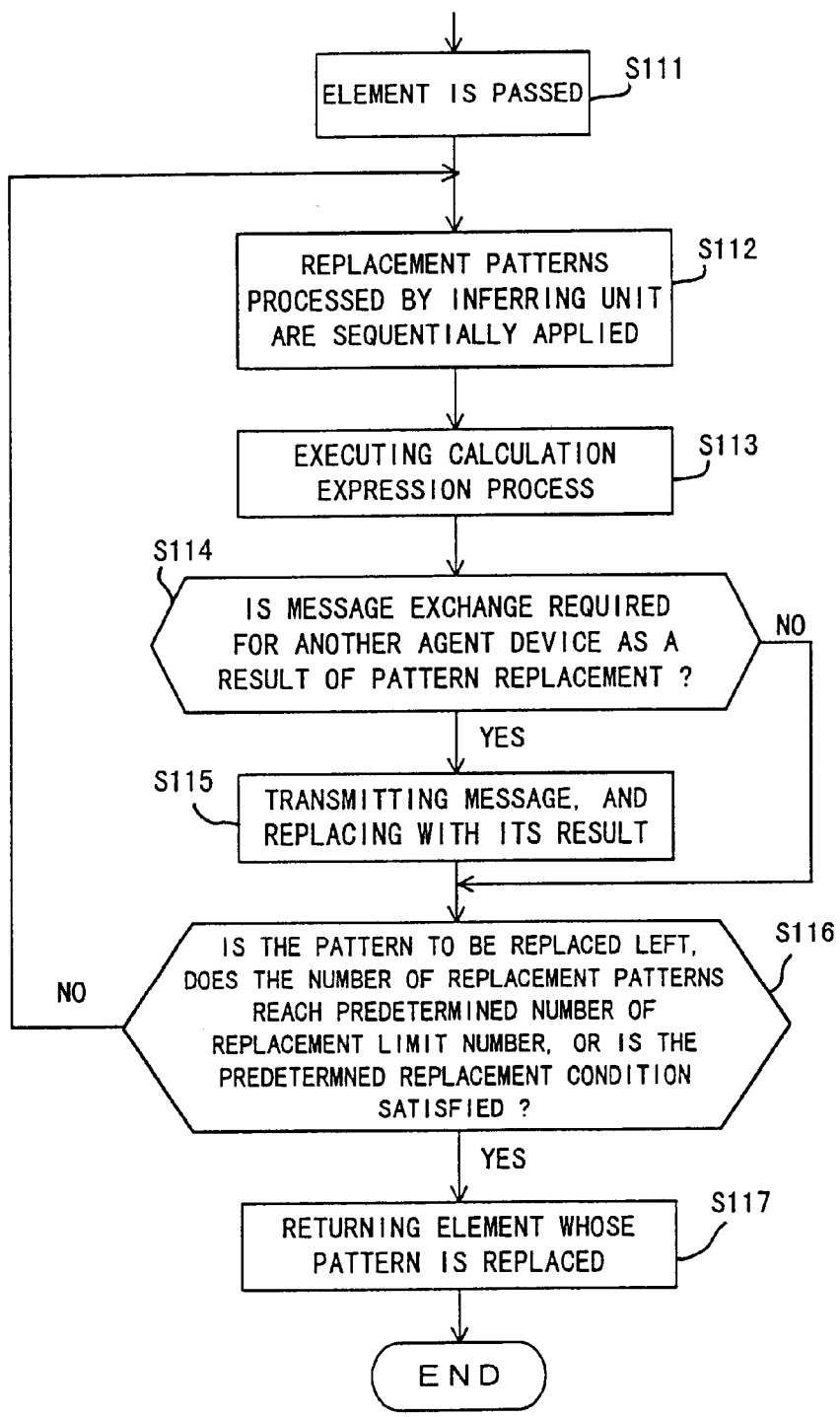
FIG. 10 is a flowchart showing the process performed by an inferring unit in the intermediary agent device.

FIG. 10 is a flowchart showing the process performed by the inferring unit 222 in the intermediary agent device 2.

When the reply list elements are passed from the conditional reply processing unit 221, the inferring unit 222 sequentially applies the replacement patterns that the inferring unit 222 itself possesses in step S112. The calculation expressions included in the replacement patterns are executed in step S113. As a result of replacing with the patterns, it is determined whether or not the transmission of a message to another agent device becomes necessary in step S114. If "YES", the message is transmitted to the corresponding agent device and an element is replaced with the result.

Then, it is determined whether or not no pattern to be replaced is left, whether or not the number of replacement patterns reaches a predetermined replacement limit number, or whether or not a predetermined replacement pattern condition is satisfied in step S116. The process in steps S112 through S115 is repeated until any of the above described determinations is made. If any of them is made, the element replaced with a pattern is returned to the conditional reply processing unit 21 in step S117, and the process is terminated.

For the above described process, the inferring unit 222 possesses a replacement pattern table and replacement restriction information such as a replacement limit number, etc.

[9] Message Transmitting/Receiving Unit in the Database Agent Device

Because the process of the message transmitting/receiving unit 310 in the database agent device 3 is similar to that of the message transmitting/receiving unit 110 in the user agent device 1, which is shown in FIGS. 3A, 3B, and 3C, its explanation is omitted here.

[10] Substantial Agent Unit in the Database Agent Device

Figure 11:
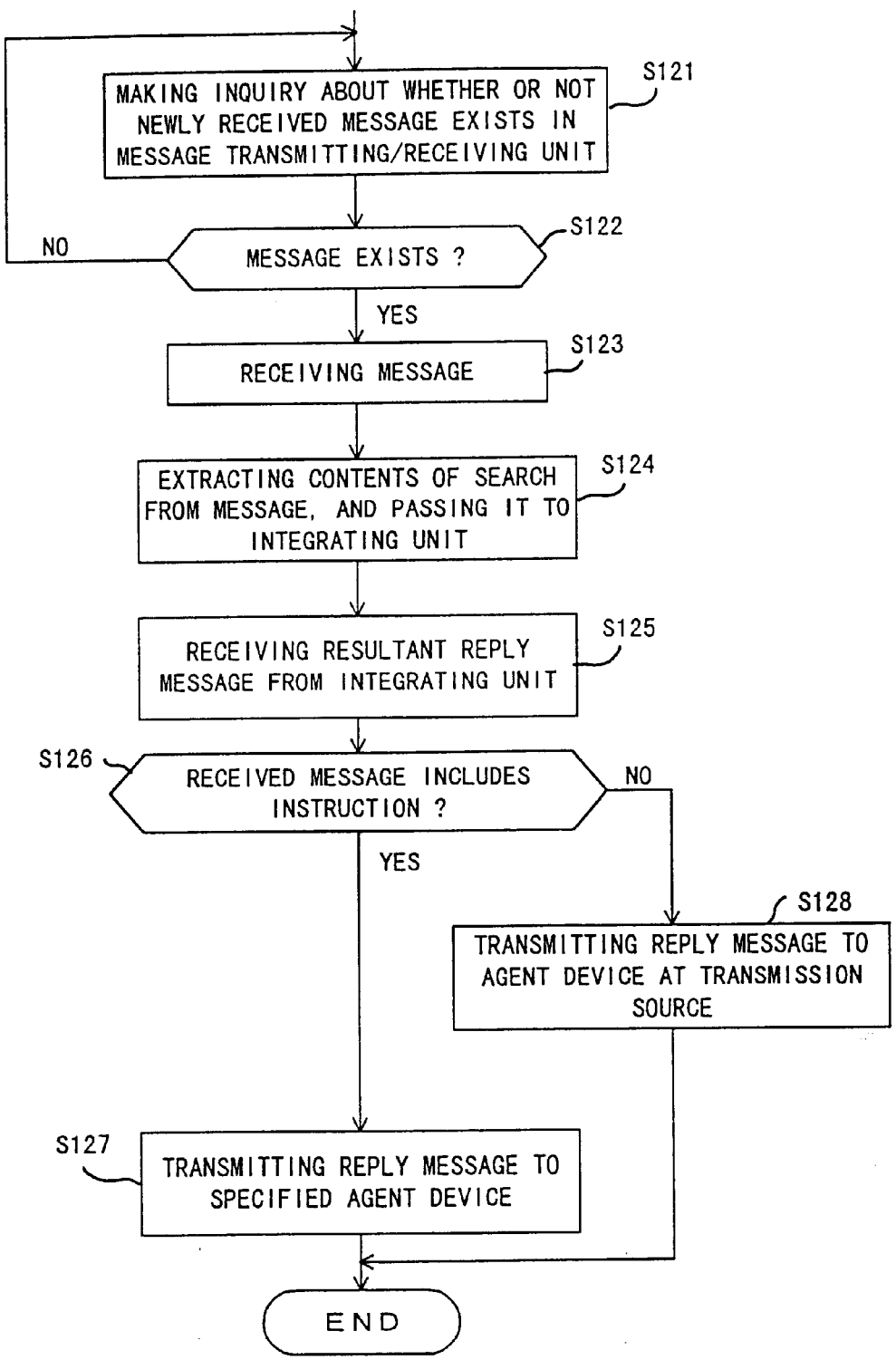
FIG. 11 is a flowchart showing the process performed by a substantial agent unit in a database agent device.

FIG. 11 is a flowchart showing the process performed by the substantial agent unit 320 in the database agent device 3.

In step S121, the inquiry about whether or not there is a newly received message is made to the message transmitting/receiving unit 310. In step S122, it is determined whether or not there is the newly received message. If "YES", the newly received message is received form the message transmitting/receiving unit 310 in step S123. Then, the contents of the retrieval itself is extracted from the message in step S124, and passed to the integrating unit 330. In step S125, the contents of the resultant reply message is received from the integrating unit 330.

Next, it is checked whether or not the received message includes the instruction of a reply destination in step S126. If "YES", the reply message is transmitted to the instructed agent device in step S127. If "NO" in step S127, the reply message is transmitted to the agent device at the transmission source in step S128.

[11] Integrating Unit in the Database Agent Device

Figure 12:
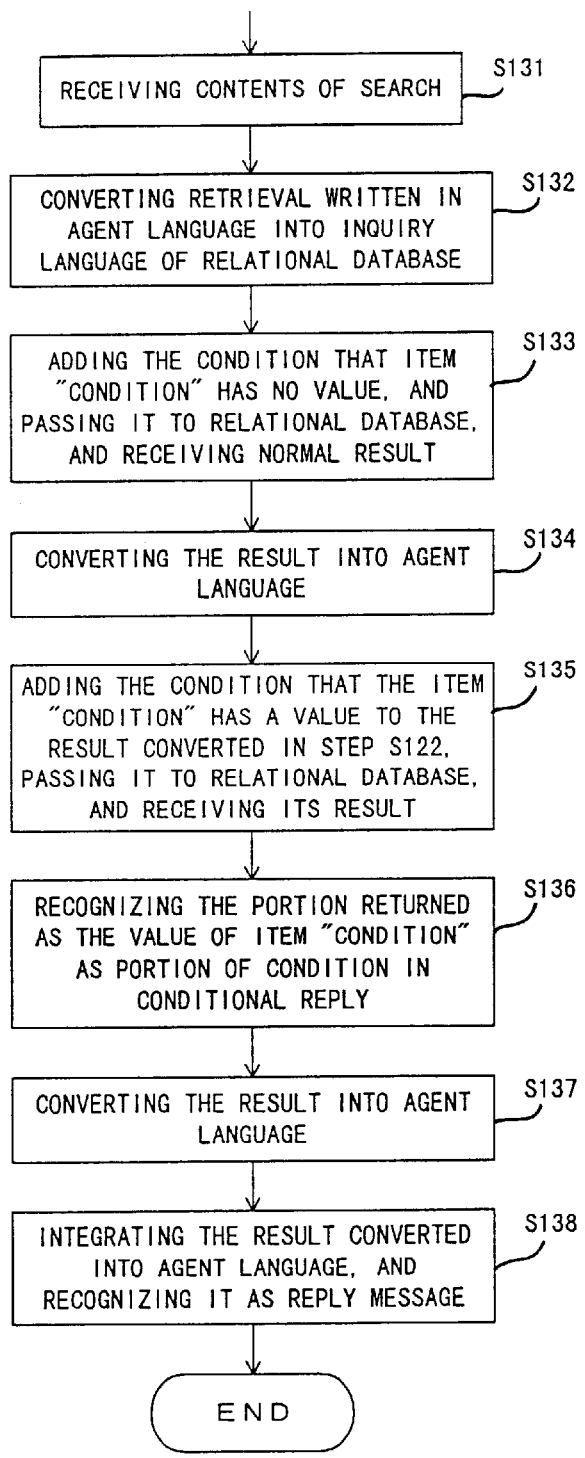
FIG. 12 is a flowchart showing the process performed by an integrating unit in the database agent device.

FIG. 12 is a flowchart showing the process performed by the integrating unit 330 in the database agent device 3.

In step S131, the integrating unit 330 receives the contents of the retrieval from the substantial agent unit 320. In step S132, the contents of the retrieval written in an agent language (such as an ACL) is converted into those in an inquiry language (such as an SQL (Structured Query Language)) of the relational database unit 340. In step S133, the condition that the item "condition" has no value" is first added to the conversion result, which is passed to the relational database 340, and the result is received. In step S134, the received result is converted into the agent language.

In step S135, the condition that the item "condition" has a value" is added to the result of the conversion into the inquiry language in step S132; the conversion result with the condition added is passed to the relational database 340; and the result is received. In step S136, the portion returned as the value of the item "condition" is recognized as the portion of the condition of the conditional reply, and combined with another result. In step S137, the combined result is converted into the agent language.

In step S138, the result of the conversion into the agent language is integrated and formed as a reply message, and returned to the substantial agent unit 320.

[12] Condition Unit in the Database Agent Device

The condition unit 341 included in the relational database 340 in the database agent device 3 is implemented as a string which is one of the items (condition item) whose character string is composed of normal values in the relational database. The record on which no condition is imposed has no value in this condition item. The record on which a condition is imposed has the condition represented in an agent language in the condition item as a character string.

Figure 13:
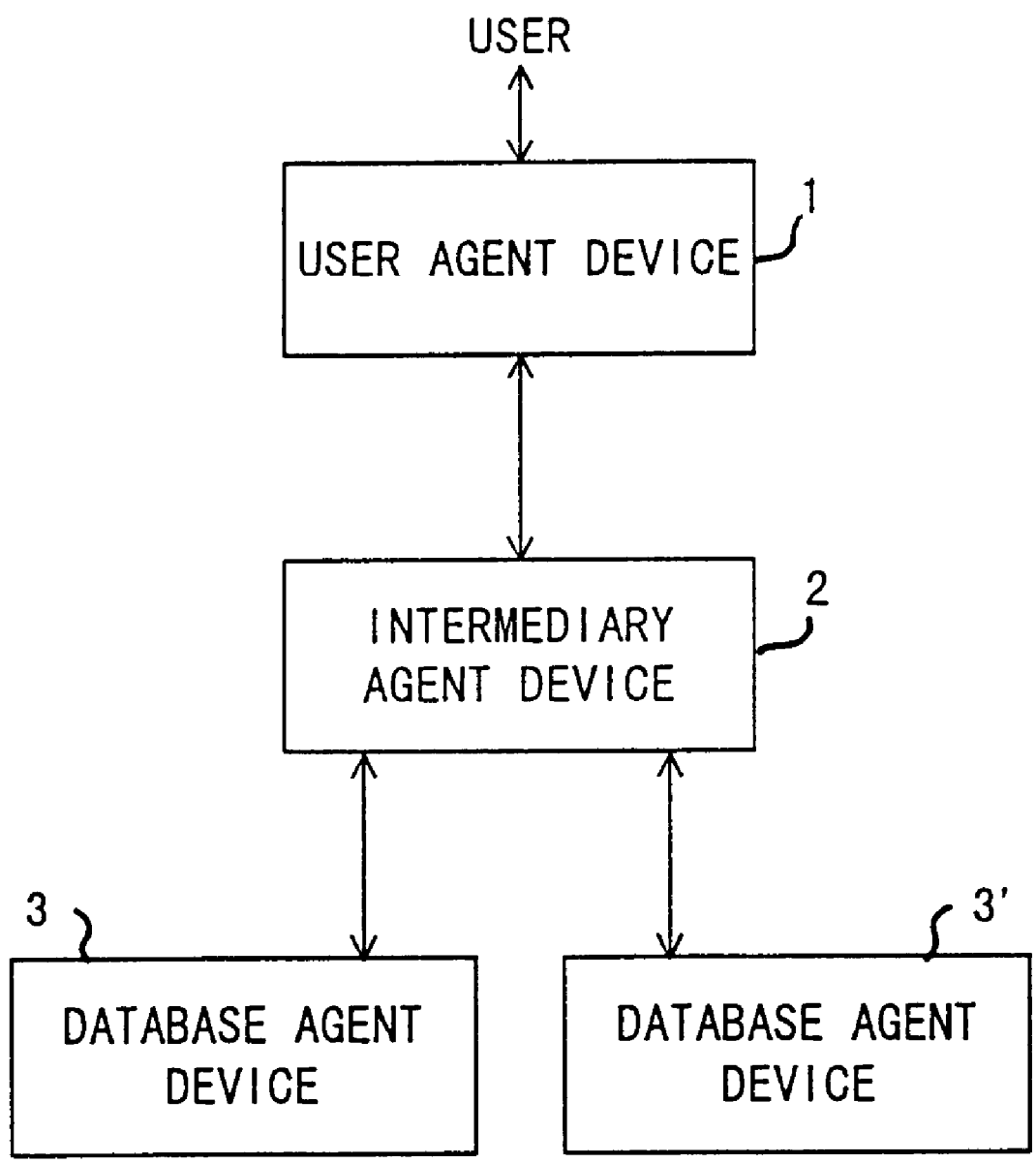
FIG. 13 is a block diagram exemplifying the system configuration for explaining an embodiment.

Provided next is the explanation about the specific embodiment to which the present invention is applied. FIG. 13 is a block diagram exemplifying the system configuration for explaining this embodiment, and shows an agent system which allows a message including a conditional reply to be exchanged.

Note that the system according to this embodiment has an additional processing capability for exchanging a message including a conditional reply on the basis of the agent system disclosed in the following documents.

REFERENCE DOCUMENTS

"SAGE (Smart AGent Environment)—Virtual Catalog", Fumihiro MARUYAMA et al., 54th National Conference Lecture Paper Collection of Information Processing Society, vol.3, pp.129–130

"SAGE: Virtual Catalog—System Design" Ryusuke MASUOKA et al, 54th National Conference Lecture Paper Collection of Information Processing Society, vol.3, pp.131–132, "SAGE: Virtual Catalog—User Agent" Tamami SUGASAKA et al, 54th National Conference Lecture Paper Collection of Information Processing Society, vol.3, pp.133–134

"SAGE: Virtual Catalog—Putting a Database into an Agent" Yo SATO et.al., 54th National Conference Lecture Paper Collection of Information Processing Society, vol.3, pp.135–136

The agent device 1, the intermediary agent device 2, and the database agent devices 3 and 3' respectively have the capabilities of the agent device 1, the intermediary agent device 2, and the database agent device 3, which are shown in FIG. 1. The agent device 1, the intermediary agent device 2, and the database agent devices 3 and 3' communicate with each other by using the ACL (Agent Communication Language) as a language common to the agents.

The ACL is an inter-agent communication language which stipulates messages exchanged between agents. It is composed of a KIF (Knowledge Interchange Format) which declaratively states knowledge such as the contents of information, etc.; a KQML (Knowledge Query and Manipulation Language) which is the language for stipulating the portion (called performative) corresponding to the verb prescribing a transaction of an inter-agent communication; and ontology which is a common term system common to agents.

To make a communication between agents by using the ACL, actual information must be put into an abstract form as the knowledge (VKB: Virtual Knowledge Base) possessed by the agents. Since handled information is a database in the configuration shown in FIG. 13, the information in each database, which is put into an abstract form, will become the VKB possessed by the database agent devices 3 and 3'. Here, the VKB for implementing a retrieval capability is defined as a "set of records from which specified field values can be extracted".

The definition of the VKB in the KIF is as follows:

```
(defrelation database (?db) :=
  (and (set ?db)
       (exists (?set-of-fields)
         (and (set ?set-of-fields)
              (not (empty ?set-of-fields))
              (forall (?record ?field)
                (=> (member ?record ?db)
                    (member ?field ?set-of-fields)
                    (defined (field-value ?record
                      ?field))))))))
```

An access to the VKB is implemented by extracting part of the knowledge described in the VKB depending on a condition, and specifying the operation (such as a taking-out operation, erasing operation, rewrite operation, etc.) to be performed for the extracted knowledge.

If an access is made to the VKB by using the ACL, the knowledge of the VKB to be targeted by a KIF relation is extracted based on a KIF relation, and the operation to be performed for the extracted knowledge is specified with the performative in the KQML.

As the performative in the KQML, "ask-all/ask-one (asking)", "reply (replying)", "advertise (advertising)", "sorry (notification that a reply cannot be made)", etc. can be cited.

In the user agent device (device name: ua@ua-machine) 1, a user first requests a retrieval on a retrieval instruction input screen shown in FIG. 14. That is, the user inputs "apple" to a category cell, and presses a retrieval button. As a result, the user interface unit 130 in the user agent device 1 converts the user instruction into retrieval instruction data shown in FIG. 15, and passes this data to the substantial agent unit 120.

The substantial agent unit 120 converts the passed data into the ACL message which is shown in FIG. 16 and intended for transmitting the retrieval instruction shown in FIG. 15 to the retrieval massage transmission destination agent device name (assumed to be "facilitator@fac-machine" here), and transmits the converted ACL retrieval message. Note that the data handled by the agent system according to this embodiment is limited to "agricultural products", and that the database agent device 3 is assumed to have the configuration shown in FIG. 1.

The intermediary agent device 2 which has received this retrieval message shown in FIG. 16 further transmits this retrieval message to a suitable agent device. The integrating unit 330 in the database agent device 3, which has lastly received this retrieval message, will operate as follows.

Here, assume that the relational database unit 340 in the database agent device 3 includes the information of a product master shown in FIG. 17 as a relational database table.

The integrating unit 330 receive the contents of the retrieval itself shown in FIG. 18 from the retrieval message shown in FIG. 16.

First of all, the retrieval message is converted into the following query language (assumed as an SQL here) of the relational database unit 340.

SELECT product name, production place, unit price
FROM product master
WHERE category="apple";

Additionally, the condition of having "no value" is added to the condition item (assumed as the item whose name is "condition" here), converted into the following form, and transmitted to the relational database 340.

SELECT product name, production place, unit price
FROM product master
WHERE category="apple" AND condition is null;

Then, the relational database 340 returns the following result:

"delicious apple", "Aomori Prefecture", 1000
"ball apple", "Hiroshima Prefecture", 1500

If this result is converted into an ACL list form:

("delicious apple", "Aomori Prefecture", 1000)
("ball apple", "Hiroshima Prefecture", 1500

Next, the condition item is added as a retrieval target to the retrieval message which is shown in FIG. 16 and converted into the query language (SQL) of the relational database. The condition of having a value is added to the condition item, converted into the following form, and transmitted to the relational database 340.

SELECT product name, production place, unit price
FROM product master
WHERE category="apple" AND condition is not null;

Then, the relational database 340 returns the following result.

---

"conditional apple", "Nagano Prefecture", 2000,
    "(and (deal amount ?deal amount)
        (>= ?deal amount 50))"
"condition exists · apple", "Nagano Prefecture", 2500,
    "(and (deal amount ?deal amount)
        (=< ?deal amount 60))"
"multiple conditions exist · apple",
    "Nagano Prefecture", 3000
        "and (deal amount ?deal amount)
        (producer ?producer)
        (>= ?deal amount 50)
        (= producer "Maruyama Farm"))"

---

This data is converted into an ACL list shown in FIG. 19.

Lastly, the obtained two ACL lists are integrated and the result shown in FIG. 20 is returned.

With the above described operations of the integrating unit 330, the database agent device 3 lastly transmits the reply message shown in FIG. 21.

The intermediary agent device 2 which receives the reply message including the conditional reply, which is shown in FIG. 21, attempts to satisfy the conditions as much as possible by using the conditional reply processing unit 221 and the inferring unit 222.

Here, assume that the intermediary agent device 2 (device name: facilitator@fac-machine) has received the message shown in FIG. 21.

First of all, the information except for the contents of the message are registered as the replacement patterns of the inferring unit 222 as shown in FIG. 22. This is because they might be used in order to satisfy the conditions.

Since the contents of the message shown in FIG. 21 is a reply list, the reply list which is the content of the message shown in FIG. 23 is extracted.

The conditional reply processing unit 221 passes each of the elements included in the reply list to the inferring unit 222, and adds each result to a new list.

The inferring unit 222 has, for example, replacement pattern tables shown in FIGS. 24A and 24B. The replacement pattern table shown in FIG. 24A indicates that all of deal amounts are 100, while the replacement pattern table shown in FIG. 24B indicates that the deal amounts are replaced with the result inquired to "omnipotent@heaven".

Assuming that the inferring unit 222 has the replacement pattern table shown in FIG. 24A, the following operations are performed.

The initial two elements in the reply list shown in FIG. 23 are returned unchanged because they are normal replies. For example, "deal amount ?deal amount" in the third element in FIG. 23 matches the replacement pattern "(deal amount 100)".

---

(if (and(deal amount ?deal amount)
    (>= ?deal amount 50))
    (listof "conditional apple"
      "Nagano Prefecture" 2000))
"?deal amount" shown in Fig. 23 is replaced with "100". Therefore, "(>= ?deal amount 50)" becomes "(>=

-continued

```
    100 50)", and the condition is satisfied.
  Consequently, the following list is returned.
      ("conditional apple" "Nagano Prefecture" 2000)
```

If the fourth element shown in FIG. 23 is processed in a similar manner, it becomes "(=<100 60)". Therefore, the condition is not satisfied and the element is not returned.

```
      (if (and(deal amount ?deal amount)
              (=< ?deal amount 60))
         (listof "condition exists · apple"
                 "Nagano Prefecture" 2500))
```

Similarly, if the fifth element shown in FIG. 23 is processed, only part of the conditions is satisfied.

```
      (if (and(deal amount ?deal amount)
              producer ?producer)
              (>= ?deal amount 50)
              (= producer "Maruyama Farm"))
         (listof "multiple conditions exist · apple"
                 "Nagano Prefecture" 3000))
```

The result that part of the conditions is satisfied will become as follows.

```
      (if (and(deal amount ?deal amount)
              (producer "Maruyama Farm"))
         (listof "multiple conditions exist · apple"
                 "Nagano Prefecture" 3000))
```

Consequently, the conditional reply processing unit 221 returns the new reply message shown in FIG. 25.

If the inferring unit 222 having the replacement pattern table shown in FIG. 24B finds any matching before "(deal amount)", it appends its own name (facilitator@fac-machine) to ":sender" and transmits the following message.

```
  (ask-one
    :receiver omnipotent@heaven
    :sender facilitator@fac-machine
    :aspect ?deal amount
    :content (deal amount ?deal amount))
  Assume that the resultant message is like the
following one.
  (reply
    :receiver facilitator@fac-machine
    :sender omnipotent@heaven
    content 100
  )
```

In this case, the portion "?deal amount" in the reply list shown in FIG. 23 is replaced with the contents of the message "100", and processed in a similar manner as in the case shown in FIG. 24A.

The user agent device 1 which has received these messages notifies the user via the conditional reply processing unit 121 and the conditional reply user interface unit 131 that the conditions exist. For example, if the user agent device 1 has received the reply message shown in FIG. 26, the substantial agent unit 120 extracts the contents of the message, extracts each of the elements in the reply list, and passes each to the conditional reply processing unit 121.

For the initial element in the reply list, the instruction that the conditional reply processing unit 121 returns to the user interface unit 130 will become the one shown in FIG. 27A.

Additionally, for the fifth element in the reply list, the instruction that the conditional reply processing unit 121 returns to the user interface unit 130 will become the one shown in FIG. 27B, to which the condition ("(and (producer ?producer) (=producer "Maruyama Farm"))") is added.

Figures 28, 29:
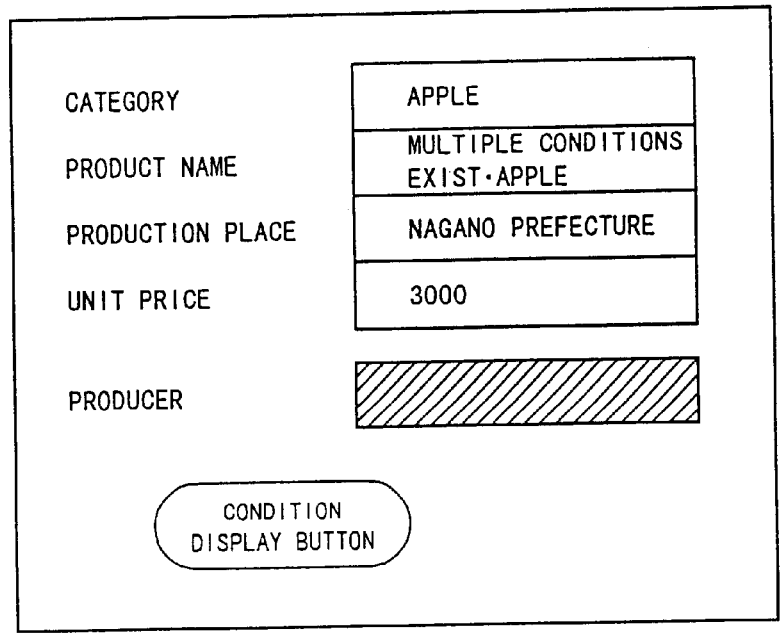
FIG. 28 exemplifies a retrieval result display screen.
FIG. 29 exemplifies a condition display.

As a display example displayed by the user interface unit 130, a dependent item is highlighted by some means or other as in the example of the retrieval result display screen shown in FIG. 28.Additionally, all of corresponding items according to a value may be displayed if the value is assigned to an item.

Furthermore, when the condition display button displayed on an exemplified screen of FIG. 28 is clicked, the condition of the conditional reply may be presented to a user by leaving the condition unchanged as shown in FIG. 29 or by putting the condition into a form easier to view for the user.

As described above, according to the present invention, a conditional reply message is transmitted if a reply can be made by imposing a condition to a retrieval message from user information, to which a reply cannot be originally made, so that an opposing side can perform processing. In this way, more delicate information link between agent device can be implemented, thereby providing more suitable information.

What is claimed is:

1. A condition reply processing method for use in a system comprised of a plurality of agents which transmit/receive messages, comprising:

transmitting an inquiry message from a first agent to a second agent;

generating a partial reply message by attempting to evaluate a condition expression in a database reply, where the condition expression is a string of a language implemented by the agents, the string comprising a logical expression with a value determinable by evaluation of boolean operators in the expression;

transmitting the generated partial reply message from the second agent to the first agent; and presenting, to a user in the first agent which receives the partial reply message, one of information reflecting an evaluation of the expression and information required to evaluate the expression.

2. A condition reply giving agent system for use in a system comprised of a plurality of agents which transmit/receive messages; comprising:

an obtaining unit obtaining a partial reply by attempting to evaluate a condition expression in a database reply, where the condition expression is a string of a language implemented by the agents, the string comprising a logical expression with a value determinable by evaluation of boolean operators in the expression; and a presenting unit presenting one of information reflecting an evaluation of the expression and information required to evaluate the expression to a user in an agent device which receives the partial reply.

3. The condition reply giving agent system according to claim 2, wherein said presenting unit further comprises a satisfying unit satisfying all or part of the condition expression in the partial database reply by evaluating the condition expression with preregistered information.

4. A condition reply giving agent system for use in an agent system including a first agent having a user interface unit and a second agent which processes a request issued from another agent, wherein the second agent comprises a replying unit integrating a direct database reply without an expression and a partial database reply having a condition expression from a database by evaluating the condition expression with the direct database reply, where the condition expression is a string of a language implemented by the agents, the string comprising a logical expression with a value determinable by evaluation of boolean operators in the expression; and the first agent comprises a presenting unit presenting one of information reflecting an evaluation of the expression and information required to evaluate the expression to a user by using a user interface unit.

5. The condition reply giving agent system according to claim 4, wherein said presenting unit further comprises a satisfying unit satisfying all or part of the condition expression in the partial database reply by evaluating the condition expression with preregistered information.

6. A condition reply giving agent system for use in an agent system including a first agent having a user interface unit, a second agent processing a request from another agent, and a third agent intermediating the request from another agent to another agent, wherein the third agent device comprises a transmitting unit obtaining a partial reply by attempting to evaluate a condition expression in a database reply and transmitting a partial reply message to the first agent, and if the expression cannot be fully evaluated the third agent transmits a request message from the first agent to the second agent, where the condition expression is a a string of a language implemented by the agents, the string comprising a logical expression with a value determinable by evaluation of boolean operators in the expression; and the first agent comprises a presenting unit presenting one of information reflecting an evaluation of the expression and information required to evaluate the expression by using the user interface unit.

7. The condition reply giving agent system according to claim 6, wherein the third agent further comprises a satisfying unit satisfying all or part of the condition expression by evaluating the expression with preregistered information.

8. A program storage medium for storing a program, which is to be executed in an agent intermediating a request and a reply between agents, for directing a computer to perform, comprising:

transferring a request from a first agent to a second agent which can process the request;

obtaining a partial reply by attempting to evaluate a condition expression in a database reply, where the condition expression is a string of a language implemented by the agents, the string comprising a logical expression with a value determinable by evaluation of boolean operators in the expression; and satisfying all or part of the condition expression by evaluating the expression with preregistered information.

9. An information retrieving system of agents, comprising:

data storing means for storing a plurality of pieces of data to be searched;

condition expression inputting means for inputting a condition expression for retrieving desired data;

determining means for determining whether the condition expression input by said condition expression inputting means can be evaluated; and answering means for answering an obtained partial reply message by evaluating the condition expression of a reply with predetermined data based on stored replacement patterns if the expression can be evaluated as determined to by said determining means, where the condition expression is a string of a language implemented by the agents, the string comprising a logical expression with a value determinable by evaluation of boolean operators in the expression.

10. An information retrieving method in a system of agents, comprising:

inputting a condition expression for retrieving desired data;

retrieving the desired data from the data to be searched by using the condition expression;

determining whether the condition expression can be evaluated; and answering an obtained partial reply message by evaluating the condition expression of a reply with predetermined data based on stored replacement patterns if the expression can be evaluated, where the condition expression is a string of a language implemented by the agents, the string comprising a logical expression with a value determinable by evaluation of boolean operators in the expression.

11. A computer-readable storage medium storing an information retrieving program for directing a computer running an agent to perform, comprising:

inputting a condition expression for retrieving desired data;

retrieving the desired data from the data to be searched by using the condition expression;

determining whether the condition expression can be evaluated; and answering an obtained partial reply message by evaluating the condition expression of a reply with predetermined data based on stored replacement patterns if the expression can be evaluated, where the condition expression is a string of a language implemented by the agents, the string comprising a logical expression with a value determinable by evaluation of boolean operators in the expression.

12. An information retrieving method between agents in a system comprised of a user agent to which at least a user makes a direct access, and a database agent which accesses an information database, comprising:

transmitting an inquiry message from the user agent to the database agent;

generating a partial reply message by attempting to evaluate a condition expression in a database reply, where the condition expression is a string of a language implemented by the agents, the string comprising a logical expression with a value determinable by evaluation of boolean operators in the expression;

transmitting the partial reply message from the database agent to the user agent; and presenting one of information reflecting an evaluation of the expression and information required to evaluate the expression by the user agent.

13. An information retrieving system of agents, comprising:
- a data storing unit storing a plurality of pieces of data to be searched;
- a condition expression inputting unit inputting a condition expression for retrieving desired data;
- a determining unit determining whether the condition expression input by said condition expression inputting unit can be evaluated;
- an answering unit answering an obtained condition reply message by replacing a condition of a reply with predetermined data based on stored replacement patterns if the conditions are determined to be insufficient by said determining unit, the condition reply containing information relating to a condition describing data queried from a relational database, where the condition expression is a string of a language implemented by the agents, the string comprising a logical expression with a value determinable by evaluation of boolean operators in the expression; and
- a notifying unit notifying an insufficient portion of the condition expression whose conditions are insufficient based on contents answered by said answering unit.

14. A method, in a system of agents, for responding to a message with a partial reply, comprising:
- transmitting an inquiry request message;
- obtaining a partial reply to the request message by evaluating a condition expression in a database reply, where the condition expression is a string of a language implemented by the agents, the string comprising a logical expression with a value determinable by evaluation of boolean operators in the expression; and
- presenting one of information reflecting an evaluation of the expression and information required to evaluate the expression to a user.

15. A method, in a system of agents, for responding to an inquiry when conditions for responding are insufficient, comprising:
- inputting a condition expression for retrieving desired data;
- determining whether the condition expression can be evaluated, where the condition expression is a string of a language implemented by the agents, the string comprising a logical expression with a value determinable by evaluation of boolean operators in the expression; and
- answering an obtained partial reply message by evaluating the condition expression of a reply with predetermined data based on stored replacement patterns if the expression can be evaluated as determined.

16. An information retrieving system of agents, comprising:
- a data storing unit storing a plurality of pieces of data to be searched;
- a condition expression inputting unit inputting a condition expression for retrieving desired data; and
- an answering unit answering an obtained partial reply message by evaluating the condition expression, where the partial reply message is an inquiry answer which is valid if the condition expression is evaluated to be true, and wherein the partial reply message contains information queried from a relational database that is used to evaluate the condition expression, where the condition expression is a string of a language implemented by the agents, the string comprising a logical expression with a value determinable by evaluation of boolean operators in the expression.

17. A method, in a system of agents, for responding to an inquiry, comprising:
- receiving an inquiry request message; and
- replying with a partial reply to the inquiry where the partial reply has a reply whose answer to the inquiry is conditioned on an evaluation of an expression having a variable describing data queried from a relational database, where the expression is a string of a language implemented by the agents, the string comprising a logical expression with a value determinable by evaluation of boolean operators in the expression.

18. A method, in a system of agents, for responding to a message with a condition expression reply, comprising:
- transmitting an inquiry request message;
- receiving a partial reply to the request message that has a condition expression that contains a variable describing data queried from a relational database.

19. A condition reply processing method for use in a system comprised of a plurality of agents which transmit/receive messages, comprising:
- transmitting an inquiry message from a first agent to a second agent;
- generating a partial reply message by attempting to evaluate a condition expression in a database reply with values corresponding to variables in the expression that are received from other agents, where the condition expression is a string of a language implemented by the agents, the string comprising a logical expression with a value determinable by evaluation of boolean operators in the expression;
- transmitting the generated partial reply message from the second agent to the first agent; and
- presenting, to a user in the first agent which receives the partial reply message, one of information reflecting an evaluation of the expression and information required to evaluate the expression.

20. A database search apparatus, comprising:
- tables, each table comprising a column that contains strings that comprise expressions that comprise a first term that comprises an operator and a variable;
- agents receiving a search request;
- a set of said agents, said set searching the tables according to the request and receiving results of the searching, where the results comprise rows that match the request and that contain expressions and values; and
- one of the agents collecting the results of the set of agents, and said one of the agents using the collected values to reduce the collected expressions, where an expression is a string of a language implemented by the agents, the string comprising a logical expression with a value determinable by evaluation of boolean operators in the expression.

21. The apparatus according to claim 20, wherein the reducing comprises evaluating the collected expressions by replacing a variable with a value and performing the corresponding operator, and wherein the evaluating produces one of a value and a reduced expression comprising at least one less operator than the unreduced expression that is reported as a response to the search request.

22. An apparatus for searching a database, comprising:
- tables, each table comprising a column that contains strings that comprise expressions that comprise a first term that comprises an operator and a variable;

agents receiving a search request;

a set of said agents, said set searching the tables according to the request and receiving partial results of the searching, where the partial results comprise rows with values that match the request and that contain expressions; and one of the agents in the plurality of agents collecting the results of the set of agents, and using the collected values to evaluate the collected expressions, where an expression is a string of a language implemented by the agents, the string comprising a logical expression with a value determinable by evaluation of boolean operators in the expression.

23. The apparatus according to claim 22, wherein the evaluating comprises replacing a variable with a value and performing the corresponding operator, thereby producing an evaluated value and a reduced expression comprising at least one less operator than the unevaluated expression.

24. A method for searching a database comprising:

searching the database according to a request;

receiving partial results of the searching, the results comprising unconditioned result information that unconditionally satisfies the request, and the partial results also comprising conditioned result information comprising an expression, where the expression is a string of a language, the string comprising a logical expression with a value determinable by evaluation of boolean operators in the expression;

determining automatically whether a truth value can be determined by attempting to evaluate the expression; and deciding, when the truth value can be determined and according to the truth value, whether the conditioned result information satisfies the request.

25. The method according to claim 24, wherein the expression comprises a variable and an operator, the attempting comprises determining whether the variable has an associated value, and the evaluating comprises performing the operator with the value.

26. A method of searching a database, comprising:

receiving a search request from a user at a first agent;

sending the request to a second agent that distributes the request to a plurality of third agents;

receiving, at the second agent, a combined result of the request from the plurality of third agents, where the result comprises unconditioned result information that unconditionally satisfies the request, and also comprises conditioned result information whose satisfaction of the request is conditioned upon an expression in the result;

reducing the expression by repeatedly requesting one of the second agent and the plurality of third agents for values corresponding to variables in the expression and using those values to perform operators in the expression, thereby replacing the operators and variables with an operation result; and displaying to the user information reflective of the result and the reduced expression.

27. A method of searching a database with a system of agents, comprising:

submitting a query; and responding with a partial reply that contains a condition which if satisfied completes an answer to the query, where the condition is a string of a language implemented by the agents, the string comprising a logical expression with a value determinable by evaluation of boolean operators in the expression.

\* \* \* \* \*

UNITED STATES PATENT AND TRADEMARK OFFICE
CERTIFICATE OF CORRECTION

PATENT NO. : 6,704,731 B2
DATED : March 9, 2004
INVENTOR(S) : Ryusuke Masuoka

It is certified that error appears in the above-identified patent and that said Letters Patent is hereby corrected as shown below:

Column 17,
Line 34, after "is a" delete extra "a"

Column 22,
Line 2, after "variable" delete "and an operator"
Line 5, after "ing the" insert -- boolean --

Signed and Sealed this

Fourteenth Day of September, 2004

JON W. DUDAS
*Director of the United States Patent and Trademark Office*